(12) United States Patent
Kim et al.

(10) Patent No.: US 9,882,426 B2
(45) Date of Patent: Jan. 30, 2018

(54) METHOD AND APPARATUS FOR DETECTING EFFICIENCY OF WIRELESS POWER TRANSMISSION

(75) Inventors: Nam Yun Kim, Seoul (KR); Sang Wook Kwon, Seongnam-si (KR); Yun Kwon Park, Dongducheon-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1204 days.

(21) Appl. No.: 13/484,967

(22) Filed: May 31, 2012

(65) Prior Publication Data

US 2012/0306285 A1 Dec. 6, 2012

Related U.S. Application Data

(60) Provisional application No. 61/491,953, filed on Jun. 1, 2011.

(30) Foreign Application Priority Data

Aug. 5, 2011 (KR) .......................... 10-2011-0078078

(51) Int. Cl.
| | |
|---|---|
| *H02J 17/00* | (2006.01) |
| *H02J 5/00* | (2016.01) |
| *H02J 7/02* | (2016.01) |
| *B60L 11/18* | (2006.01) |

(52) U.S. Cl.
CPC ............. *H02J 17/00* (2013.01); *B60L 11/182* (2013.01); *B60L 11/1833* (2013.01); *H02J 5/005* (2013.01); *H02J 7/025* (2013.01); *B60L 2210/10* (2013.01); *B60L 2210/30* (2013.01); *B60L 2210/40* (2013.01); *B60L 2250/16* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01);

(Continued)

(58) Field of Classification Search
CPC . H02J 17/00; H02J 5/005; H02J 7/025; B60L 11/182; Y02T 90/121; Y02T 90/122; Y02T 90/12
USPC .......................................................... 307/104
See application file for complete search history.

(56) References Cited

U.S. PATENT DOCUMENTS

| | | | |
|---|---|---|---|
| 8,412,963 B2 * | 4/2013 | Tsai .......................... | G06F 1/266 307/104 |
| 8,417,359 B2 * | 4/2013 | Tsai .......................... | H02J 17/00 307/104 |
| 2004/0061380 A1 | 4/2004 | Hann et al. | |

(Continued)

FOREIGN PATENT DOCUMENTS

| | | |
|---|---|---|
| JP | 2004-120915 A | 4/2004 |
| JP | 2010-141977 A | 6/2010 |

(Continued)

*Primary Examiner* — Jared Fureman
*Assistant Examiner* — Emmanuel R Dominique
(74) *Attorney, Agent, or Firm* — NSIP Law

(57) ABSTRACT

Provided are a method and apparatus for detecting an efficiency of a wireless power transmission. An output power of a source device may be adjusted based on current that is flowing in a power converter of the source device. The efficiency of wireless power transmission may be calculated based on the adjusted output power, and an amount of power used by a target device.

15 Claims, 33 Drawing Sheets

(52) U.S. Cl.
CPC ............ *Y02T 90/125* (2013.01); *Y02T 90/127* (2013.01); *Y02T 90/14* (2013.01)

(56) References Cited

U.S. PATENT DOCUMENTS

| | | | | |
|---|---|---|---|---|
| 2008/0115988 A1* | 5/2008 | Holland | ............... | B60L 11/1877 180/65.6 |
| 2009/0134816 A1* | 5/2009 | Sloan | ................... | H05B 33/083 315/307 |
| 2009/0174263 A1* | 7/2009 | Baarman | ................. | H02J 5/005 307/104 |
| 2010/0036773 A1* | 2/2010 | Bennett | ............... | G06Q 20/3674 705/67 |
| 2010/0072825 A1* | 3/2010 | Azancot | ................. | H02J 5/005 307/104 |
| 2010/0164296 A1* | 7/2010 | Kurs | ....................... | H01Q 1/248 307/104 |
| 2010/0187909 A1* | 7/2010 | Mueller | ............... | H04B 5/0025 307/104 |
| 2010/0327766 A1* | 12/2010 | Recker | ..................... | H02J 9/02 315/291 |
| 2011/0006731 A1* | 1/2011 | Wang | ................... | B60L 11/1816 320/109 |
| 2011/0196544 A1* | 8/2011 | Baarman | ................. | H02J 5/005 700/291 |
| 2011/0291489 A1* | 12/2011 | Tsai | ........................ | H02J 17/00 307/104 |
| 2012/0235509 A1* | 9/2012 | Ueno | ...................... | H02J 5/005 307/104 |
| 2013/0127256 A1* | 5/2013 | Kim | ........................ | H02J 17/00 307/104 |

FOREIGN PATENT DOCUMENTS

| | | |
|---|---|---|
| KR | 10-2003-0072999 A | 9/2003 |
| KR | 10-0836631 A | 6/2008 |
| KR | 10-2010-0122934 A | 11/2010 |
| KR | 10-2010-0133557 A | 12/2010 |
| KR | 10-2011-0032260 A | 3/2011 |
| KR | 10-1035334 B1 | 5/2011 |
| WO | WO 2009/105595 A3 | 8/2009 |
| WO | WO 2009105595 A2 * | 8/2009 ............ H02J 7/0004 |
| WO | WO 2011/061821 A1 * | 5/2011 ............... H02J 17/00 |

* cited by examiner

2300

2400

METHOD AND APPARATUS FOR DETECTING EFFICIENCY OF WIRELESS POWER TRANSMISSION

CROSS-REFERENCE TO RELATED APPLICATION(S)

This application claims the benefit under 35 U.S.C. § 119(e) of U.S. Provisional Application No. 61/491,953, filed on Jun. 1, 2011, in the United States Patent and Trademark Office, and claims the benefit under 35 U.S.C. § 119(a) of Korean Patent Application No. 10-2011-0078078, filed on Aug. 5, 2011, in the Korean Intellectual Property Office, the entire disclosures of which are each incorporated herein by reference for all purposes.

BACKGROUND

1. Field

The following description relates to a method and apparatus for detecting an efficiency of wireless power transmission.

2. Description of Related Art

Wireless power is energy that may be transferred from a wireless power transmitter to a wireless power receiver through magnetic coupling. Generally, a wireless power transmission and charging system includes a source device and a target device. The source device may wirelessly transmit power, and the target device may wirelessly receive power. In this example, the source device is referred to as a wireless power transmitter and the target device is referred to as a wireless power receiver.

Typically a source device includes a source resonator and the target device includes a target resonator. Magnetic coupling or resonance coupling may occur between the source resonator and the target resonator.

A single source device may transmit power to a plurality of target devices. For example, if a plurality of target devices simultaneously approach a resonator of a source device, or the plurality of target devices are located near the resonator of the source device, data collision may occur due to the plurality of target devices when power is supplied to the source device during an operation for initial connection. Accordingly, a normal charging operation may not be performed.

SUMMARY

In one general aspect, there is provided a method of detecting an efficiency of a wireless power transmission from a source device to a target device, the method including determining an initial value of an output power based on information about power used by the target device, transmitting the output power corresponding to the determined initial value to the target device, detecting a current of the output power, adjusting the output power based on the detected current, and calculating the efficiency of the wireless power transmission, based on the adjusted output power and the information about the power used by the target device.

The method may further comprise receiving the information about the power used by the target device from the target device.

The method may further comprise receiving, from the target device, information about power that is received by the target device, wherein the efficiency is calculated based on the information about the power that is received by the target device and the adjusted output power.

The adjusting may comprise, in response to the detected current increasing, increasing the output power until the detected current becomes constant.

The method may further comprise interrupting an operation of the source device, in response to the calculated efficiency being lower than a reference efficiency.

In another aspect, there is provided a method of detecting an efficiency of a wireless power transmission, the method including determining an initial value of an output power based on information about power used by a target device, transmitting the output power corresponding to the determined initial value to the target device, receiving, from the target device, information about power that is received by the target device, and calculating the efficiency of the wireless power transmission based on the information about the power that is received by the target device and the output power.

The information about the power that is received by the target device may comprise information about power flowing in a virtual load of the target device.

The information about the power that is received by the target device may comprise information about a current flowing in the target device in a state in which a path connected to a load of the target device is blocked.

The method may further comprise adjusting the output power based on the information about the power that is received by the target device, wherein the adjusting is performed repeatedly until the power received by the target device reaches an amount of power required by the target device.

The method may further comprise interrupting an operation of a source device, in response to the calculated efficiency being lower than a reference efficiency.

In another aspect, there is provided a computer-readable storage medium having stored therein program instructions to cause a processor to execute a method of detecting an efficiency of a wireless power transmission from a source device to a target device, the method including determining an initial value of an output power based on information about power used by the target device, transmitting the output power corresponding to the determined initial value to the target device, detecting a current of the output power, adjusting the output power based on the detected current, and calculating the efficiency of the wireless power transmission, based on the adjusted output power and the information about the power used by the target device.

In another aspect, there is provided a wireless power transmitter, including a controller to determine an initial value of an output power based on information about power used by a target device, a resonator to transmit the output power corresponding to the determined initial value to the target device, and a power detector to detect a current of the output power, wherein the controller adjusts the output power based on the detected current, and calculates an efficiency of a wireless power transmission based on the adjusted output power and the information about the power used by the target device.

The controller may receive the information about the power used by the target device from the target device.

The controller may receive, from the target device, information about power that is received by the target device, and calculate the efficiency based on the information about the power that is received by the target device and the adjusted output power.

In response to the detected current increasing, the controller may increase the output power until the detected current becomes constant.

In response to the calculated efficiency being lower than a reference efficiency, the controller may interrupt an operation of a source device.

In another aspect, there is provided a wireless power transmitter, including a controller to determine an initial value of an output power based on information about power used by a target device, and a resonator to transmit the output power corresponding to the determined initial value to the target device, wherein the controller receives, from the target device, information about power that is received by the target device, and calculates an efficiency of a wireless power transmission based on the information about the power that is received by the target device and the output power.

The information about the power that is received by the target device may comprise information about power flowing in a virtual load of the target device.

The information about the power that is received by the target device may comprise information about a current flowing in the target device in a state in which a path connected to a load of the target device is blocked.

The controller may adjust the output power based on the information about the power that is received by the target device, and continue to adjust the output power until the power received by the target device reaches an amount of power required by the target device.

In response to the calculated efficiency being lower than a reference efficiency, the controller may interrupt an operation of a source device.

In response to a value of the current being equal to or greater than a set value determined based on the efficiency and the output power, the controller may interrupt the operation of the source device.

Other features and aspects will be apparent from the following detailed description, the drawings, and the claims.

Figure 1:
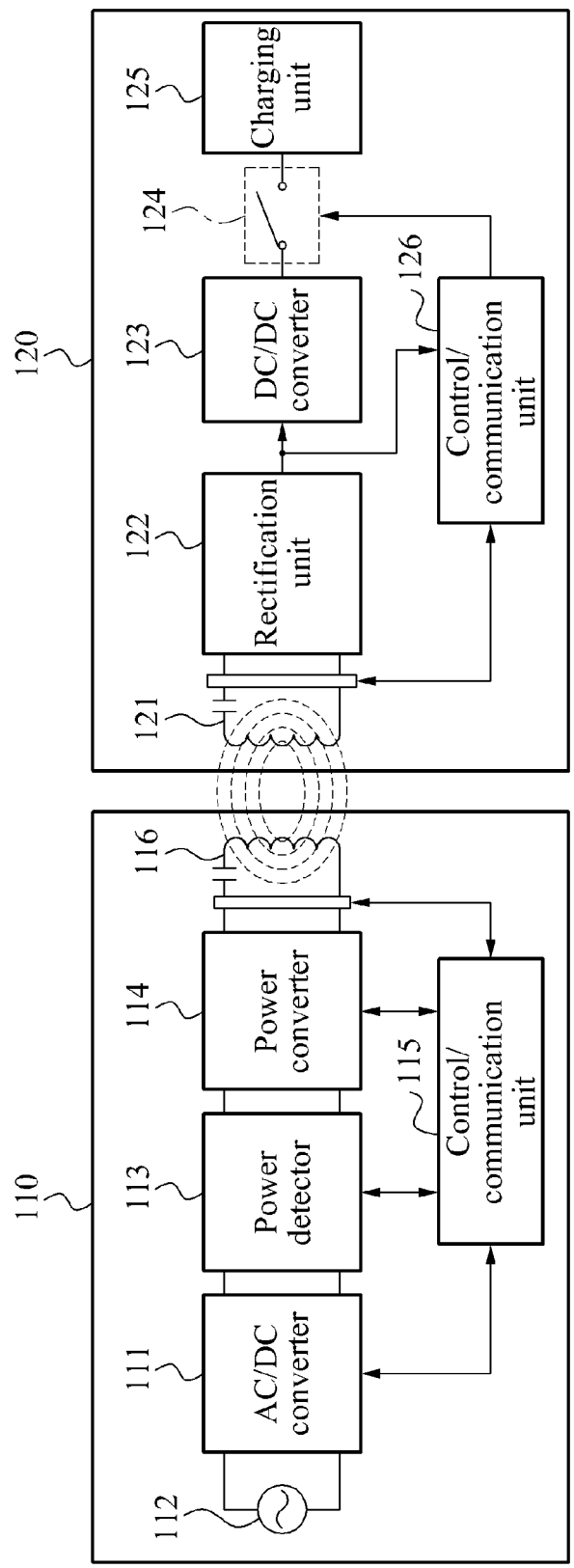
FIG. 1 is a diagram illustrating an example of a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Various examples herein are directed towards wireless power transmission and reception. The source and target devices described herein may be or may be included in a terminal. For example, the terminal may include a mobile phone, a computer, a tablet, an appliance, and the like. As an example, the target device may be a terminal and the source device a charging station that may be used to wireless supply power to the terminal.

FIG. 1 illustrates an example of a wireless power transmission and charging system.

Referring to FIG. 1, the wireless power transmission and charging system includes a source device 110 and a target device 120.

In this example, the source device 110 includes an alternating current-to-direct current (AC/DC) converter 111, a power supply 112, a power detector 113, a power converter 114, a control and communication (control/communication) unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 may generate a DC voltage by rectifying an AC voltage, for example, in a band of tens of hertz (Hz) or more that are output from the power supply 112. The AC/DC converter 111 may output a DC voltage of a predetermined level, or may adjust an output level of a DC voltage, for example, based on the control of the control/communication unit 115.

The power detector 113 may detect an output current and an output voltage of the AC/DC converter 111, and may transfer information about the detected current and the detected voltage to the control/communication unit 115. Additionally, the power detector 113 may detect an input current and an input voltage of the power converter 114.

The power converter 114 may generate a power by converting a DC voltage of a predetermined level to an AC voltage, for example, using a switching pulse signal in a band of a few kilohertz (KHz) to tens of megahertz (MHz). For example, the power converter 114 may convert a DC voltage supplied to a power amplifier (PA) to an AC voltage, using a reference resonant frequency $F_{Ref}$, and may generate a communication power used for communication, or a charging power used for charging.

The communication power or the charging power may be used in a plurality of target devices. The communication power may refer to low power of 0.1 milliwatt (mW) to 1 mW, and the charging power may refer to high power of 1 mW to 200 W which may be consumed in a device load of a target device. In various examples described herein, the term "charging" may be used to refer to supplying power to a unit or element that is configured to charge power. Additionally, the term "charging" may be used to refer to supplying power to a unit or element that is configured to consume power. The units or elements may include, for example, batteries, displays, sound output circuits, main processors, and various sensors.

Also, the term "reference resonant frequency" may be used to refer to a resonant frequency that is used by the source device 110. Additionally, the term "tracking frequency" may be used to refer to a resonant frequency that is adjusted by a preset scheme.

The control/communication unit 115 may detect a reflected wave of the communication power or the charging power, and may detect mismatching that may occur between the target resonator 121 and the source resonator 116 based on the detected reflected wave. To detect the mismatching, for example, the control/communication unit 115 may detect an envelope of the reflected wave, a power amount of the reflected wave, and the like. The control/communication unit 115 may compute a voltage standing wave ratio (VSWR), based on a voltage level of the reflected wave, and based on a level of an output voltage of the source resonator 116 or the power converter 114. For example, if the VSWR is less than a predetermined value, the control/communication unit 115 may determine that mismatching occurs. In this example, the control/communication unit 115 may compute a power transmission efficiency for each of N tracking frequencies, may determine a tracking frequency $F_{Best}$ with the best power transmission efficiency among the N tracking frequencies, and may adjust the reference resonant frequency $F_{Ref}$ to the tracking frequency $F_{Best}$. In various examples, the N tracking frequencies may be set in advance.

The control/communication unit 115 may control a frequency of a switching pulse signal. Under the control of the control/communication unit 115, the frequency of the switching pulse signal may be determined. For example, by controlling the power converter 114, the control/communication unit 115 may generate a modulation signal to be transmitted to the target device 120. In other words, the control/communication unit 115 may transmit various messages to the target device 120 using in-band communication. The control/communication unit 115 may detect a reflected wave, and may demodulate a signal received from the target device 120 through an envelope of the detected reflected wave.

The control/communication unit 115 may generate a modulation signal for in-band communication. For example, the control/communication unit 115 may generate the modulation signal by turning on or off a switching pulse signal, by performing delta-sigma modulation, and the like. Additionally, the control/communication unit 115 may generate a pulse-width modulation (PWM) signal with a predetermined envelope.

The control/communication unit 115 may also perform out-band communication that employs a communication channel. For example, the control/communication unit 115 may include a communication module, such as a ZigBee module, a BLUETOOTH® module, and the like. The control/communication unit 115 may transmit or receive data to or from the target device 120 through the out-band communication.

The source resonator 116 may transfer an electromagnetic energy to the target resonator 121. For example, the source resonator 116 may transfer the communication power or charging power to the target device 120, through magnetic coupling with the target resonator 121.

The target resonator 121 may receive the electromagnetic energy from the source resonator 116. For example, the target resonator 121 may receive the communication power or charging power from the source device 110, through magnetic coupling with the source resonator 116. Additionally, the target resonator 121 may receive various messages from the source device 110, for example, using the in-band communication.

The rectification unit 122 may generate a DC voltage by rectifying an AC voltage. The AC voltage may be received from the target resonator 121.

The DC/DC converter 123 may adjust a level of the DC voltage that is output from the rectification unit 122, for example, based on a capacitance of the charging unit 125. For example, the DC/DC converter 123 may adjust the level of the DC voltage output from the rectification unit 122 from 3 volts to 10 volts.

The switch unit 124 may be turned on or off, under the control of the control/communication unit 126. For example, if the switch unit 124 is turned off, the control/communication unit 115 of the source device 110 may detect a reflected wave. In other words, if the switch unit 124 is turned off, the magnetic coupling between the source resonator 116 and the target resonator 121 may be reduced or eliminated.

The charging unit 125 may include a battery. The charging unit 125 may charge the battery using a DC voltage output from the DC/DC converter 123.

The control/communication unit 126 may perform in-band communication for transmitting or receiving data using a resonant frequency. During the in-band communication, for example, the control/communication unit 126 may demodulate a received signal by detecting a signal between the target resonator 121 and the rectification unit 122, or by detecting an output signal of the rectification unit 122. In other words, the control/communication unit 126 may demodulate a message received through the in-band communication. The control/communication unit 126 may adjust an impedance of the target resonator 121, to modulate a signal to be transmitted to the source device 110. For example, the control/communication unit 126 may modulate the signal to be transmitted to the source device 110, by turning on or off the switch unit 124. As an example, the control/communication unit 126 may increase the impedance of the target resonator 121 such that a reflected wave may be detected by the control/communication unit 115 of the source device 110. In this example, depending on whether the reflected wave is detected, the control/communication unit 115 may detect a binary number "0" or "1."

The control/communication unit 126 may transmit a response message to the source device 110. For example, the response message may include a "type of a corresponding target device," "information about a manufacturer of a corresponding target device," "a model name of a target device," a "battery type of a target device," a "scheme of charging a target device," an "impedance value of a load of a target device," "information on characteristics of a target resonator of a target device," "information on a frequency band used by a target device," an "amount of a power consumed by a target device," an "identifier (ID) of a target device," "information on version or standard of a target device," and the like The control/communication unit 126 may also perform out-band communication that employs a communication channel. For example, the control/communication unit 126 may include a communication module, such as a ZigBee module, a BLUETOOTH® module, and the like. The control/communication unit 126 may transmit or receive data to or from the source device 110 through the out-band communication.

The control/communication unit 126 may receive a wake-up request message from the source device 110, may detect an amount of a power received to the target resonator 121, and may transmit information about the detected amount of the power to the source device 110. The information about the detected amount may include, for example, an input voltage value and an input current value of the rectification unit 122, an output voltage value and an output current value of the rectification unit 122, an output voltage value and an output current value of the DC/DC converter 123, and the like.

In FIG. 1, the control/communication unit 115 may set a resonance bandwidth of the source resonator 116. Based on the setting of the resonance bandwidth of the source resonator 116, a Q-factor of the source resonator 116 may be determined.

Additionally, the control/communication unit 126 may set a resonance bandwidth of the target resonator 121. Based on a setting of the resonance bandwidth of the target resonator 121, a Q-factor of the target resonator 121 may be determined. For example, the resonance bandwidth of the source resonator 116 may be set wider or narrower than the resonance bandwidth of the target resonator 121. The source device 110 and the target device 120 may communicate with each other in order to share information about the resonance bandwidth of the source resonator 116 and the resonance bandwidth of the target resonator 121. In an example in which power requested by the target device 120 is higher than a reference value, the Q-factor of the source resonator 116 may be set to a value greater than "100." In another example in which the power requested by the target device 120 is lower than the reference value, the Q-factor of the source resonator 116 may be set to a value less than "100".

A Q-factor may consider a change in a distance between the source resonator 116 and the target resonator 121, a change in the resonance impedance, impedance mismatching, a reflected signal, and the like, and is represented by Qt. In this example, Qt may have an inverse-proportional relationship with the resonance bandwidth, as given by Equation 1.

$$\frac{\Delta f}{f_0} = \frac{1}{Qt}$$
$$= \Gamma_{S,D} + \frac{1}{BW_S} + \frac{1}{BW_D}$$
[Equation 1]

In Equation 1, $f_0$ denotes a central frequency, $\Delta f$ denotes a change in a bandwidth, $\Gamma_{S,D}$ denotes a reflection loss between the source resonator 116 and the target resonator 121, $BW_S$ denotes the resonance bandwidth of the source resonator 116, and $BW_D$ denotes the resonance bandwidth of the target resonator 121.

An efficiency U of the wireless power transmission may be defined, as given in the example of Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa}$$
[Equation 2]

In Equation 2, $\kappa$ denotes a coupling coefficient of energy coupling that occurs between the source resonator 116 and the target resonator 121, $\Gamma_S$ denotes a reflection coefficient in the source resonator 116, $\Gamma_D$ denotes a reflection coefficient in the target resonator 121, $\omega_0$ denotes a resonant frequency, M denotes a mutual inductance between the source resonator 116 and the target resonator 121, $R_S$ denotes an impedance of the source resonator 116, $R_D$ denotes an impedance of the target resonator 121, $Q_S$ denotes the Q-factor of the source resonator 116, $Q_D$ denotes the Q-factor of the target resonator 121, and $Q_K$ denotes a Q-factor of the energy coupling that occurs between the source resonator 116 and the target resonator 121.

Referring to Equation 2, the Q-factors may have a high relevance to the efficiency of the wireless power transmission. Accordingly, to increase the efficiency of the wireless power transmission, the Q-factors may be set to higher values. For example, if the Q-factors $Q_S$ and $Q_D$ are set to higher values, the efficiency of the wireless power transmission may be reduced due to a change in the coupling coefficient $\kappa$, a change in the distance between the source resonator 116 and the target resonator 121, a change in the resonance impedance, impedance mismatching, and the like.

Additionally, to increase the efficiency of the wireless power transmission, if the resonance bandwidth of the source resonator 116 and the resonance bandwidth of the target resonator 121 are set to be narrow, impedance mismatching and the like may occur due to even a small external effect. Considering the impedance mismatching, Equation 1 may be represented as given in Equation 3.

$$\frac{\Delta f}{f_0} = \frac{\sqrt{VSWR} - 1}{Qt\sqrt{VSWR}} \qquad \text{[Equation 3]}$$

In an example in which an unbalanced relationship of a resonance bandwidth or a bandwidth of an impedance matching frequency between the source resonator 116 and the target resonator 121 is maintained, a reduction in efficiency of the wireless power transmission may be prevented due to a change in the coupling coefficient κ, a change in the distance between the source resonator 116 and the target resonator 121, a change in the resonance impedance, the impedance mismatching, and the like. In an example in which the unbalanced relationship of the resonance bandwidth or the bandwidth of the impedance matching frequency between the source resonator 116 and the target resonator 121 is maintained, based on Equations 1 and 3, an unbalanced relationship between the Q-factors $Q_S$ and $Q_D$ may also be maintained.

Hereinafter, the term "resonator" in FIGS. 2A through 4B may include, for example, a source resonator, and a target resonator.

Figure 2A:
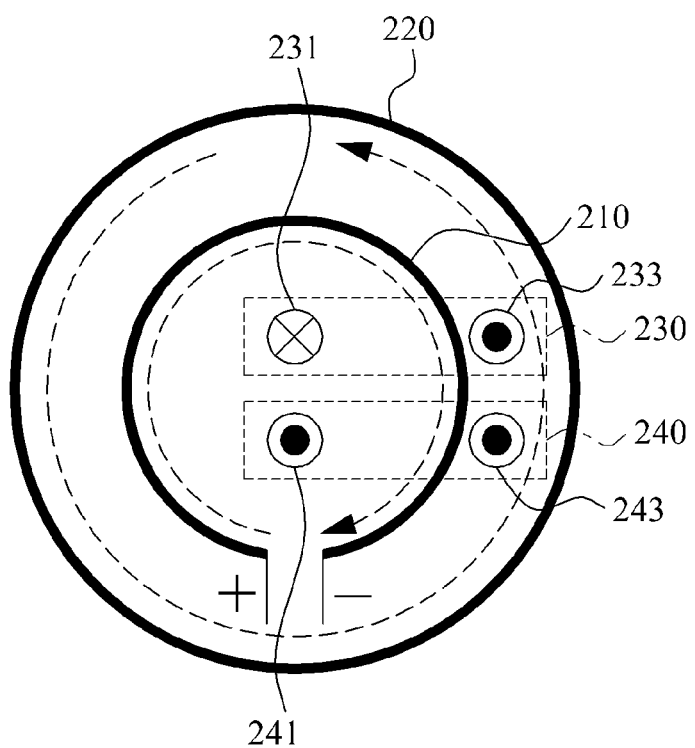
FIGS. 2A through 2B are diagrams illustrating examples of a distribution of a magnetic field in a feeder and a source resonator.
Figure 2B:
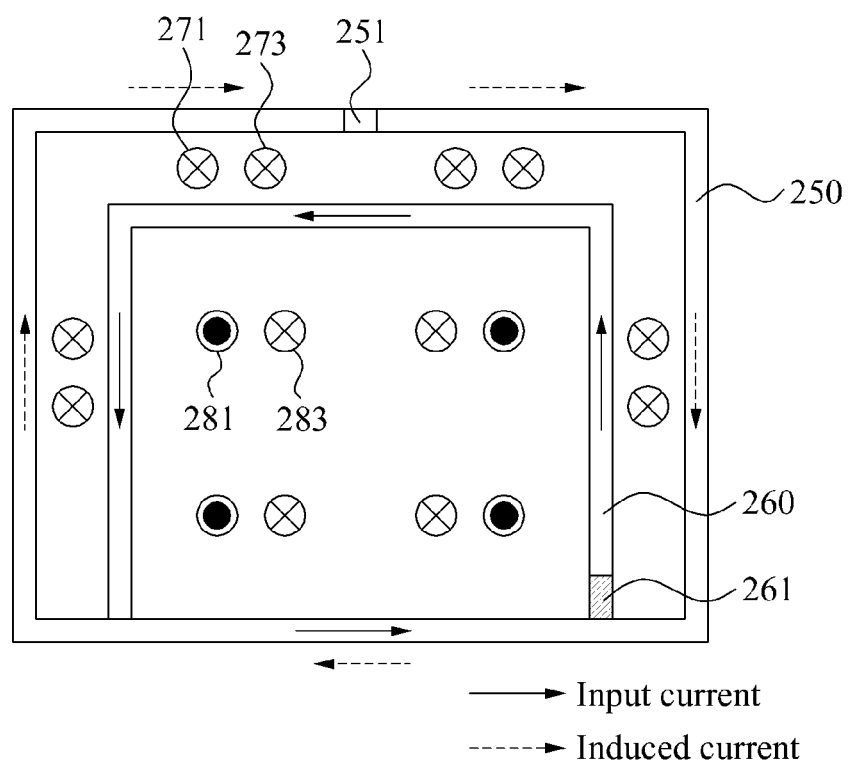

FIGS. 2A and 2B illustrate examples of a distribution of a magnetic field in a feeder and a resonator. If a resonator receives power supplied through a separate feeder, magnetic fields may be formed in both the feeder and the resonator.

Referring to FIG. 2A, as an input current flows in feeder 210, a magnetic field 230 is formed. A direction 231 of the magnetic field 230 within the feeder 210 may have a phase that is opposite to a phase of a direction 233 of the magnetic field 230 outside the feeder 210. The magnetic field 230 formed by the feeder 210 may cause an induced current to be formed in a source resonator 220. In this example, a direction of the induced current may be opposite to a direction of the input current.

As a result of the induced current, a magnetic field 240 may be formed in the source resonator 220. Directions of a magnetic field formed due to an induced current in all positions of the source resonator 220 may be the same. Accordingly, a direction 241 of the magnetic field 240 formed by the source resonator 220 may have the same phase as a direction 243 of the magnetic field 240 formed by the source resonator 220.

Consequently, if the magnetic field 230 formed by the feeder 210 and the magnetic field 240 formed by the source resonator 220 are combined, a strength of the total magnetic field may decrease within the feeder 210, however, the strength may increase outside the feeder 210. In an example in which power is supplied to the source resonator 220 through the feeder 210 as illustrated in FIG. 2A, the strength of the total magnetic field may decrease in the center of the source resonator 220, but may increase in outer edges of the source resonator 220.

If a magnetic field is randomly distributed in the source resonator 220, it may be difficult to perform impedance matching, because an input impedance may frequently vary. Additionally, if the strength of the total magnetic field is increased, an efficiency of wireless power transmission may be increased. Conversely, if the strength of the total magnetic field is decreased, the efficiency for wireless power transmission may be reduced. Accordingly, power transmission efficiency may be reduced on average.

In a target resonator, a magnetic field may be distributed as illustrated in FIG. 2A. For example, a current flowing in the source resonator 220 may be induced by the input current flowing in the feeder 210. A current flowing in the target resonator may be induced by a magnetic coupling between the source resonator 220 and the target resonator. The current flowing in the target resonator may cause a magnetic field to be formed such that an induced current may be generated in a feeder located in the target resonator. In this example, a direction of a magnetic field formed by the target resonator within the feeder may have a phase that is opposite to a phase of a direction of a magnetic field formed by the feeder and accordingly, strength of the total magnetic field may be reduced.

FIG. 2B illustrates an example of a wireless power transmitter in which a source resonator 250 and a feeder 260 have a common ground. The source resonator 250 includes a capacitor 251. The feeder 260 may receive an input of a radio frequency (RF) signal via a port 261.

For example, if the RF signal is input to the feeder 260, an input current may be generated in the feeder 260. The input current flowing in the feeder 260 may cause a magnetic field to be formed, and a current may be induced in the source resonator 250 by the magnetic field. Additionally, another magnetic field may be formed due to the induced current flowing in the source resonator 250. In this example, a direction of the input current flowing in the feeder 260 may have a phase that is opposite to a phase of a direction of the induced current flowing in the source resonator 250. Accordingly, in a region between the source resonator 250 and the feeder 260, a direction 271 of the magnetic field formed due to the input current may have the same phase as a direction 273 of the magnetic field formed due to the induced current, and thus the strength of the total magnetic field may increase. Conversely, a direction 281 of the magnetic field formed within the feeder 260 due to the input current may have a phase that is opposite to a phase of a direction 283 of the magnetic field formed due to the induced current, and thus the strength of the total magnetic field may decrease. Therefore, the strength of the total magnetic field may decrease in the center of the source resonator 250, but may increase in outer edges of the source resonator 250.

The feeder 260 may determine an input impedance by adjusting an internal area of the feeder 260. The input impedance refers to an impedance viewed in a direction from the feeder 260 to the source resonator 250. If the internal area of the feeder 260 is increased, the input impedance may be increased. Conversely, if the internal area of the feeder 260 is reduced, the input impedance may be reduced. Because the magnetic field is randomly distributed in the source resonator 250 despite a reduction in the input impedance, a value of the input impedance may vary based on a location of a target device. Accordingly, a separate matching network may be required to match the input impedance to an output impedance of a PA. For example, if the input impedance is increased, a separate matching network may be used to match the increased input impedance to a relatively low output impedance.

As an example, if a target resonator has the same configuration as the source resonator 250, and if a feeder of the target resonator has the same configuration as the feeder 260, a separate matching network may be needed, because a direction of a current flowing in the target resonator has a phase that is opposite to a phase of a direction of an induced current flowing in the feeder of the target resonator.

Figure 3A:
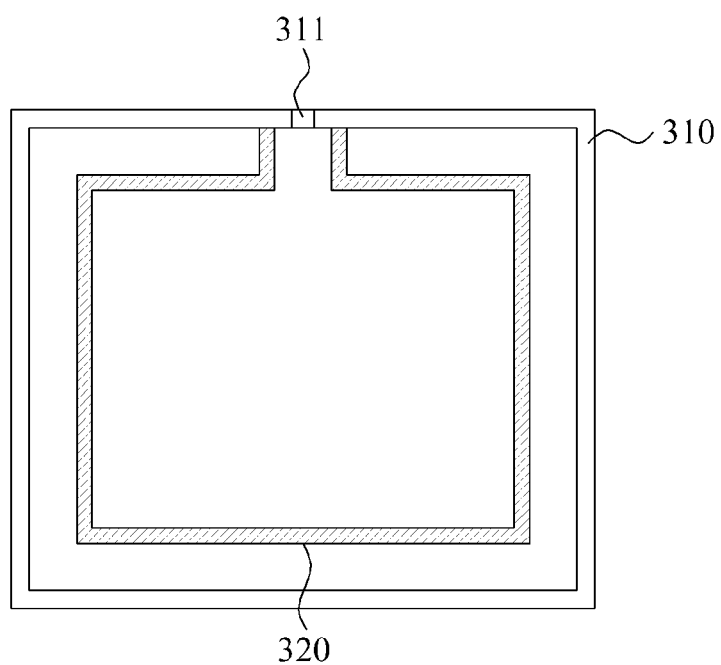
FIGS. 3A and 3B are diagrams illustrating examples of a wireless power transmitter.

FIG. 3A illustrates an example of a wireless power transmitter.

Referring to FIG. 3A, the wireless power transmitter includes a resonator 310 and a feeding unit 320. The resonator 310 may further include a capacitor 311. The feeding unit 320 may be electrically connected to both ends of the capacitor 311.

Figure 3B:
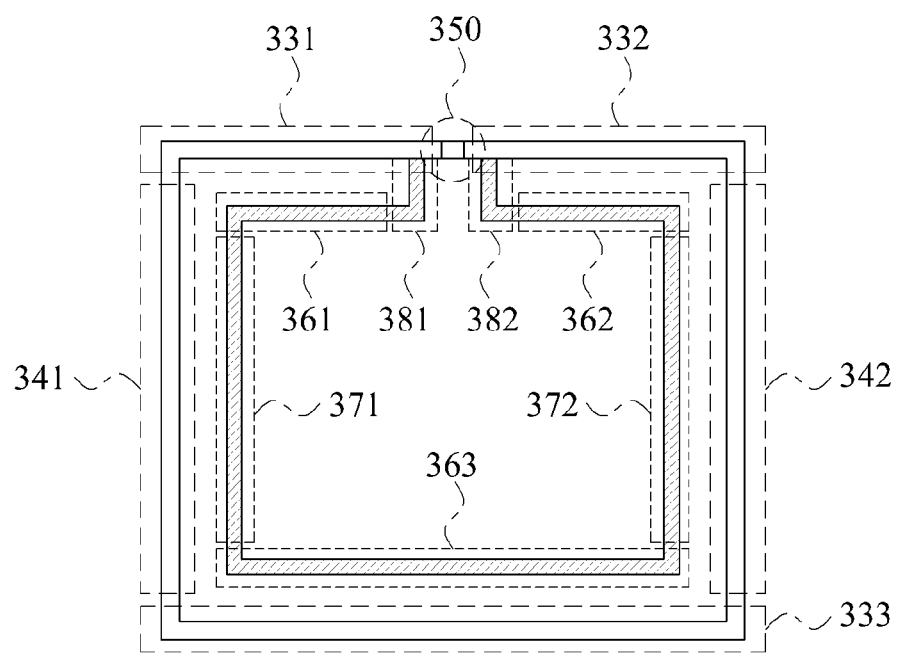

FIG. 3B illustrates another example of the wireless power transmitter of FIG. 3A. In this example, the resonator 310 may include a first transmission line, a first conductor 341, a second conductor 342, and at least one first capacitor 350.

The first capacitor 350 may be inserted in series between a first signal conducting portion 331 and a second signal conducting portion 332 in the first transmission line, and an electric field may be confined within the first capacitor 350. For example, the first transmission line may include at least one conductor in an upper portion of the first transmission line, and may include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 331 and the second signal conducting portion 332. A conductor disposed in a lower portion of the first transmission line may be referred to as a first ground conducting portion 333.

FIG. 3B is a two-dimensional (2D) illustration of the resonator 310. The first transmission line includes the first signal conducting portion 331 and the second signal conducting portion 332 in the upper portion of the first transmission line. In addition, the first transmission line includes the first ground conducting portion 333 in the lower portion of the first transmission line. The first signal conducting portion 331 and the second signal conducting portion 332 each face the first ground conducting portion 333. The current may flow through the first signal conducting portion 331 and the second signal conducting portion 332.

Additionally, one end of the first signal conducting portion 331 is shorted to the first conductor 341, and another end of the first signal conducting portion 331 is connected to the first capacitor 350. One end of the second signal conducting portion 332 is shorted to the second conductor 342, and another end of the second signal conducting portion 332 is connected to the first capacitor 350. Accordingly, the first signal conducting portion 331, the second signal conducting portion 332, the first ground conducting portion 333, and the conductors 341 and 342 are connected to each other such that the resonator 310 has an electrically closed-loop structure. The term "loop structure" may include, for example, a polygonal structure such as a circular structure, a rectangular structure, and the like. "Having a loop structure" is used to indicate that the circuit is electrically closed.

The first capacitor 350 may be inserted into an intermediate portion of the first transmission line. For example, the first capacitor 350 may be inserted into a space between the first signal conducting portion 331 and the second signal conducting portion 332. The first capacitor 350 may have a shape of, for example, a lumped element, a distributed element, and the like. For example, a distributed capacitor having the shape of the distributed element may include zigzagged conductor lines and a dielectric material that has a high permittivity and that is disposed between the zigzagged conductor lines.

If the first capacitor 350 is inserted into the first transmission line, the resonator 310 may have a characteristic of a metamaterial. The metamaterial indicates a material having an electrical property that has not been discovered in nature, and thus, is an artificially designed structure. An electromagnetic characteristic of the materials existing in nature have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, a metamaterial that has a magnetic permeability or a permittivity that is absent in nature and which may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

If a capacitance of the first capacitor 350 inserted as the lumped element is determined, the resonator 310 may have the characteristic of the metamaterial. Because the resonator 310 may have a negative magnetic permeability by adjusting the capacitance of the first capacitor 350, the resonator 310 may also be referred to as an MNG resonator. Various criteria may be applied to determine the capacitance of the first capacitor 350. For example, the criteria may include enabling the resonator 310 to have the characteristic of the metamaterial, enabling the resonator 310 to have a negative magnetic permeability in a target frequency, enabling the resonator 310 to have a zeroth order resonance characteristic in the target frequency, and the like. Based on at least one criterion among the aforementioned criteria, the capacitance of the first capacitor 350 may be determined.

The resonator 310 may have a zeroth order resonance characteristic of having, as a resonant frequency, a frequency in which a propagation constant is "0". Because the resonator 310 may have the zeroth order resonance characteristic, the resonant frequency may be independent with respect to a physical size of the MNG resonator 310. By appropriately designing the first capacitor 350, the MNG resonator 310 may sufficiently change the resonant frequency. Accordingly, the physical size of the MNG resonator 310 may not be changed.

In a near field, the electric field may be concentrated on the first capacitor 350 that is inserted into the first transmission line. Accordingly, due to the first capacitor 350, the magnetic field may become dominant in the near field. The MNG resonator 310 may have a high Q-factor using the first capacitor 350 of the lumped element, and thus, it is possible to enhance an efficiency of power transmission. For example, the Q-factor may indicate a level of an ohmic loss or a ratio of a reactance with respect to a resistor in the wireless power transmission. The efficiency of the wireless power transmission may increase according to an increase in the Q-factor.

Although not illustrated in FIG. 3B, a magnetic core may pass through the MNG resonator 310. The magnetic core may increase a power transmission distance.

Referring to FIG. 3B, the feeding unit 320 includes a second transmission line, a third conductor 371, a fourth conductor 372, a fifth conductor 381, and a sixth conductor 382.

The second transmission line includes a third signal conducting portion 361 and a fourth signal conducting portion 362 in an upper portion of the second transmission line. In addition, the second transmission line includes a second ground conducting portion 363 in a lower portion of the second transmission line. The third signal conducting portion 361 and the fourth signal conducting portion 362 each face the second ground conducting portion 363. Current may flow through the third signal conducting portion 361 and the fourth signal conducting portion 362.

Additionally, one end of the third signal conducting portion 361 is shorted to the third conductor 371, and another end of the third signal conducting portion 361 is connected to the fifth conductor 381. One end of the fourth signal conducting portion 362 is shorted to the fourth conductor 372, and another end of the fourth signal conducting portion 362 is connected to the sixth conductor 382. The fifth conductor 381 is connected to the first signal conducting portion 331, and the sixth conductor 382 is connected to the second signal conducting portion 332. The fifth conductor 381 and the sixth conductor 382 are connected in parallel to both ends of the first capacitor 350. For example, the fifth conductor 381 and the sixth conductor 382 may be used as input ports to receive an input of an RF signal.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 may be connected to each other such that the resonator 310 and the feeding unit 320 have an electrically closed-loop structure. If an RF signal is received via the fifth conductor 381 or the sixth conductor 382, an input current may flow in the feeding unit 320 and the resonator 310, a magnetic field may be formed due to the input current, and a current may be induced to the resonator 310 by the formed magnetic field. A direction of the input current flowing in the feeding unit 320 may be the same as a direction of the induced current flowing in the resonator 310, and thus, strength of the total magnetic field may increase in the center of the resonator 310, but may decrease in outer edges of the resonator 310.

An input impedance may be determined based on an area of a region between the resonator 310 and the feeding unit 320. Accordingly, a separate matching network used to match the input impedance to an output impedance of a power amplifier may not be needed. For example, even if the matching network is used, the input impedance may be determined by adjusting a size of the feeding unit 320, and thus, a structure of the matching network may be simplified. The simplified structure of the matching network may reduce a matching loss of the matching network.

The second transmission line, the third conductor 371, the fourth conductor 372, the fifth conductor 381, and the sixth conductor 382 may form the same structure as the resonator 310. In an example in which the resonator 310 has a loop structure, the feeding unit 320 may also have a loop structure. In another example in which the resonator 310 has a circular structure, the feeding unit 320 may also have a circular structure.

Figure 4A:
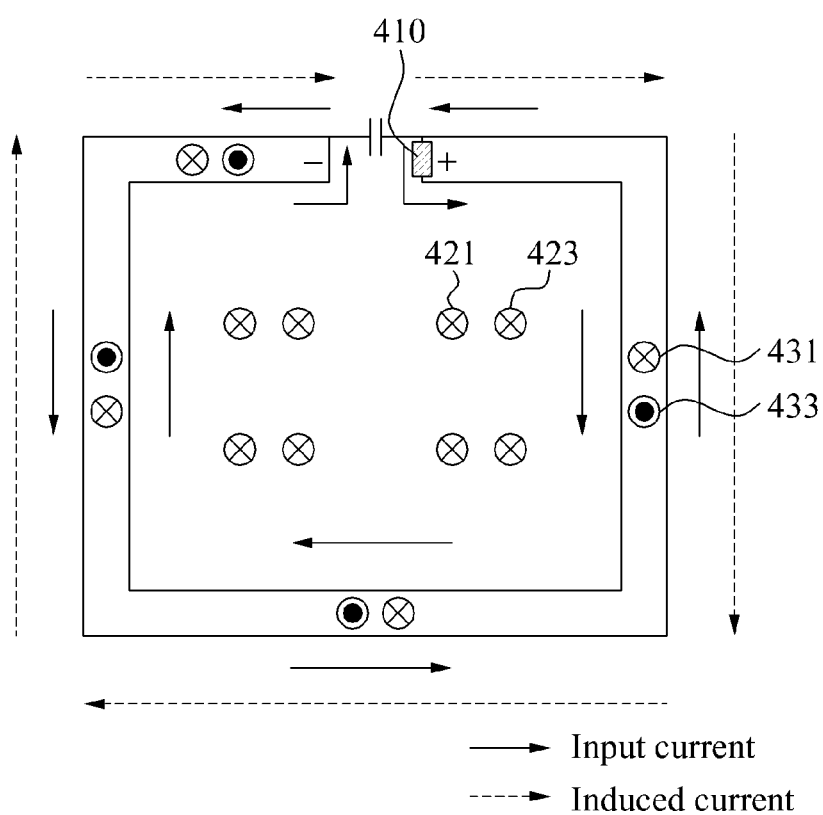
FIG. 4A is a diagram illustrating an example of a distribution of a magnetic field within a source resonator based on feeding of a feeding unit.
Figure 4B:
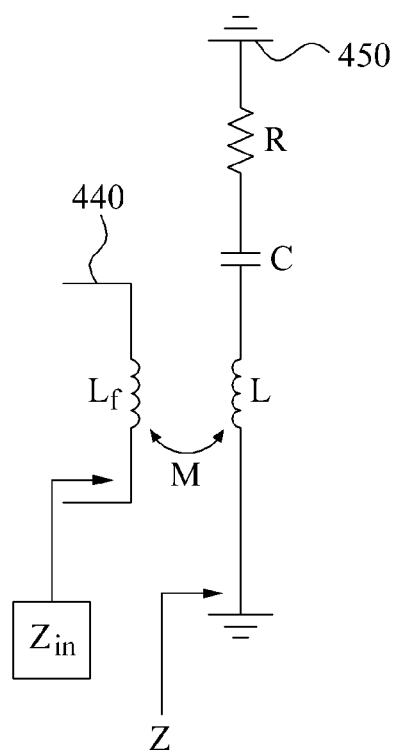
FIG. 4B is a diagram illustrating an example of an equivalent circuit of a feeding unit and a source resonator.

FIG. 4A illustrates an example of a distribution of a magnetic field within a resonator based on feeding of a feeding unit. FIG. 4A more briefly illustrates the resonator 310 and the feeding unit 320 of FIG. 3A, and FIG. 4B illustrates an equivalent circuit of a feeding unit 440, and an equivalent circuit of a resonator 450.

A feeding operation in wireless power transmission may refer to supplying a power to a source resonator, or may refer to supplying an AC power to a rectification unit. FIG. 4A illustrates a direction of an input current flowing in the feeding unit, and a direction of an induced current induced in the source resonator. Additionally, FIG. 4A illustrates a direction of a magnetic field which is formed due to the input current of the feeding unit, and a direction of a magnetic field formed due to the induced current of the source resonator.

Referring to FIG. 4A, a fifth conductor or a sixth conductor of the feeding unit may be used as an input port 410. The input port 410 may receive an RF signal as an input. The RF signal may be output from a PA. The PA may increase or decrease an amplitude of the RF signal based on a demand by a target device. The RF signal received by the input port 410 may be displayed in the form of an input current flowing in the feeding unit. For example, the input current may flow in a clockwise direction in the feeding unit, along a transmission line of the feeding unit. The fifth conductor of the feeding unit may be electrically connected to the resonator. For example, the fifth conductor may be connected to a first signal conducting portion of the resonator. Accordingly, the input current may flow in the resonator, as well as, in the feeding unit. As an example, an input current may flow in a counterclockwise direction in the resonator. The input current flowing in the resonator may cause a magnetic field to be formed such that an induced current may be generated in the resonator due to the magnetic field. The induced current may flow in a clockwise direction in the resonator. For example, the induced current may transfer energy to a capacitor of the resonator, and a magnetic field may be formed due to the induced current. In this example, the input current flowing in the feeding unit and the resonator is indicated by a solid line of FIG. 4A, and the induced current flowing in the resonator is indicated by a dotted line of FIG. 4A.

A direction of a magnetic field formed due to a current may be determined based on the right hand rule. As illustrated in FIG. 4A, a direction 421 of a magnetic field formed within the feeding unit due to the input current flowing in the feeding unit may be identical to a direction 423 of a magnetic field formed due to the induced current flowing in the resonator. Accordingly, a strength of the total magnetic field may increase within the feeding unit.

Additionally, in a region between the feeding unit and the resonator, a direction 433 of a magnetic field formed due to the input current flowing in the feeding unit has a phase that is opposite to a phase of a direction 431 of a magnetic field that is formed due to the induced current flowing in the resonator, as illustrated in FIG. 4A. Accordingly, a strength of the total magnetic field may decrease in the region between the feeding unit and the resonator.

Typically, a strength of a magnetic field decreases in the center of a resonator with the loop structure, and increases in outer edges of the resonator. However, referring to FIG. 4A, the feeding unit may be electrically connected to both ends of a capacitor of the resonator. Accordingly, the induced current of the resonator may flow in the same direction as the input current of the feeding unit. Because the induced current of the resonator flows in the same direction as the input current of the feeding unit, the strength of the total magnetic field may increase within the feeding unit, and may decrease outside the feeding unit. As a result, the strength of the total magnetic field may increase in the center of the resonator that has the loop structure, and may decrease in the outer edges of the resonator, due to the feeding unit. Thus, the strength of the total magnetic field may be equalized within the resonator.

Additionally, a power transmission efficiency for transferring a power from a source resonator to a target resonator may be in proportion to the strength of the total magnetic field formed in the source resonator. In other words, if the strength of the total magnetic field increases in the center of the source resonator, the power transmission efficiency may also increase.

Referring to FIG. 4B, the feeding unit 440 and the resonator 450 may be expressed as the equivalent circuits. An example of an input impedance $Z_{in}$ viewed in a direction from the feeding unit 440 to the resonator 450 may be computed, as given in Equation 4.

$$Z_{in} = \frac{(\omega M)^2}{Z} \quad \text{[Equation 4]}$$

In Equation 4, M denotes a mutual inductance between the feeding unit 440 and the resonator 450, ω denotes a resonant frequency between the feeding unit 440 and the resonator 450, and Z denotes an impedance viewed in a direction from the resonator 450 to a target device. The input impedance $Z_{in}$ may be in proportion to the mutual inductance M. Accordingly, the input impedance $Z_{in}$ may be controlled by adjusting the mutual inductance M. For example, the mutual inductance M may be adjusted based the size of on an area of a region between the feeding unit 440 and the resonator 450. The size of the area of the region between the feeding unit 440 and the resonator 450 may be adjusted based on a size of the feeding unit 440. In other words, the input impedance $Z_{in}$ may be determined based on the size of the feeding unit 440, and thus, a separate matching network may not be required to perform impedance matching with an output impedance of a PA.

In a target resonator and a feeding unit which are included in a wireless power receiver, a magnetic field may be distributed as illustrated in FIG. 4A. For example, the target resonator may receive a wireless power from a source resonator through magnetic coupling. Due to the received wireless power, an induced current may be generated in the target resonator. A magnetic field formed due to the induced current in the target resonator may cause another induced current to be generated in the feeding unit. In this example, if the target resonator is connected to the feeding unit as illustrated in FIG. 4A, the induced current generated in the target resonator may flow in the same direction as the induced current generated in the feeding unit. Thus, a strength of the total magnetic field may increase within the feeding unit, but may decrease in a region between the feeding unit and the target resonator.

Figure 5:
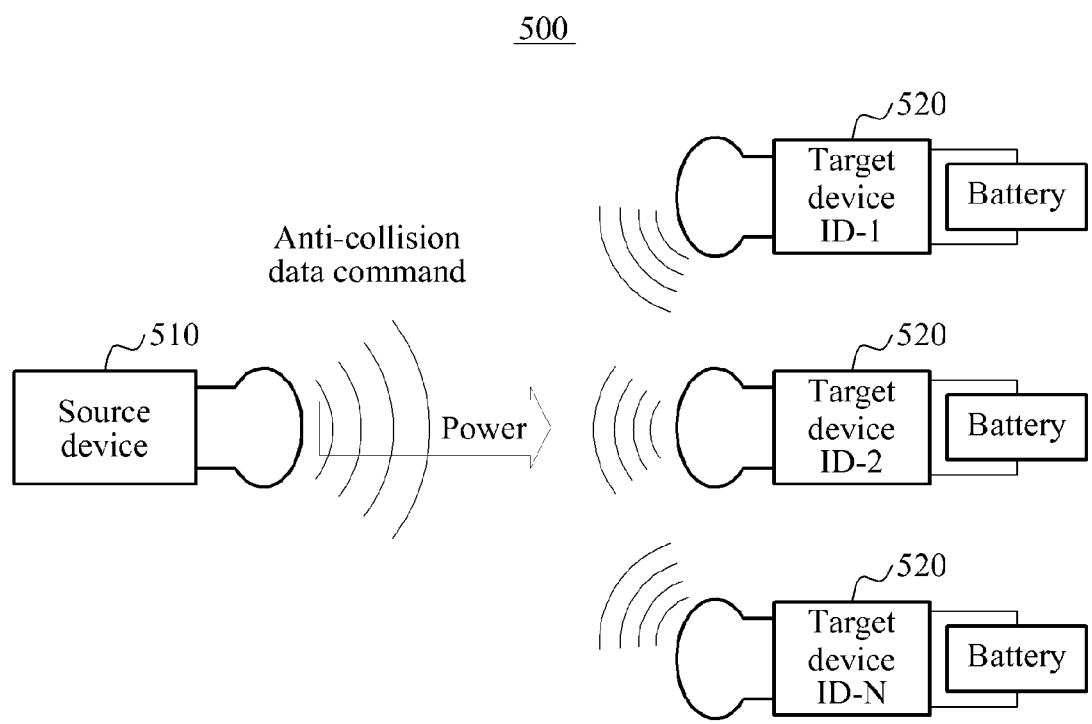
FIG. 5 is a diagram illustrating an example of a multi-target device communication environment.

FIG. 5 illustrates an example of a multi-target device communication environment.

Referring to FIG. 5, a wireless power transmission and charging system 500 includes a single source device 510, and at least one target device 520. In this example there are N target devices.

The source device 510 may transmit power to the at least one target device 520. For example, the source device 510 and the target device 520 may be the source device 110 and the target device 120 of FIG. 1, respectively. The source device 510 may output power, and an anti-collision data command. The at least one target device 520 may respectively include at least one battery.

In an example in which a plurality of target devices 520 simultaneously approach a resonator of the source device 510, or in which the plurality of target devices 520 exist in the resonator of the source device 510, if a power is supplied to the source device 510, data collision may occur due to the plurality of target devices 520. For example, the data collision may occur during an operation for initial connection. Due to the data collision, a normal charging operation may not be performed.

Figure 6:
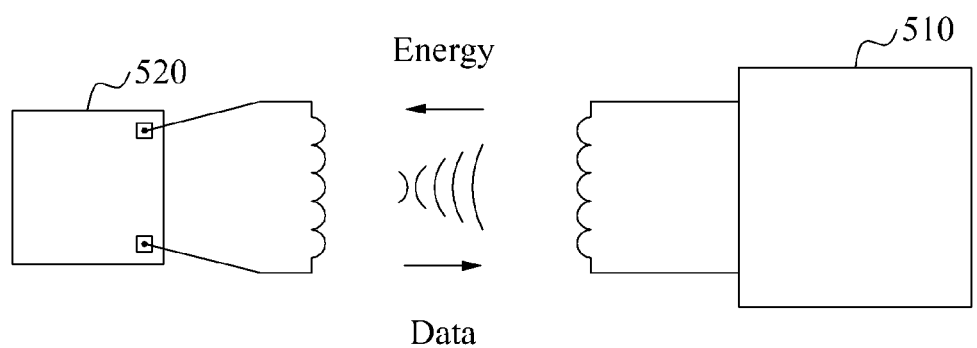
FIG. 6 is a diagram illustrating an example of a mode of a wireless power transmission and charging system of FIG. 5.

FIG. 6 illustrates an example of a mode of the wireless power transmission and charging system 500 of FIG. 5.

The wireless power transmission and charging system 500 may be operated in three modes, in terms of software. The three modes may include, for example, a standby mode, a connection mode, and a transmission and charging control mode.

The standby mode may refer to a state in which no target device 520 is located within a power transmission distance of the source device 510.

In the connection mode, the source device 510 may verify information on a type and a serial number of the target device 520, and an amount of power used by the target device 520 through an initial connection between the source device 510 and the target devices 520, and control the target device 520 to enter a normal transmission and charging control mode. The initial connection may be performed while the target device 520 is located within the power transmission distance of the source device 510.

In the connection mode, the plurality of target devices 520 may simultaneously send a connection request to the single source device 510. Hereinafter, an example of processing one-to-one communication to be performed between the source device 510 and each of the plurality of target devices 520, in response to the target devices 520 simultaneously sending a connection request to the source device 510 is further described.

The transmission and charging control mode may refer to a state in which the source device 510 communicates with the target device 520 through a slot that is assigned by the source device 510 to the target device 520 while in the connection mode.

In the source device 510, an overall operation of the wireless power transmission and charging system 500 may be classified. In a single target device 520, the standby mode, the connection mode, the transmission and charging control mode, and the standby mode may be sequentially repeated. For example, a single source device 510 and 'N' target devices 520 may perform complex and repetitive operations. For example, if a part of the plurality of target devices 520 are in the charging mode, another part of the target devices 520 may be completely charged already, and a new target device 520 may try to perform connection.

Figure 7:
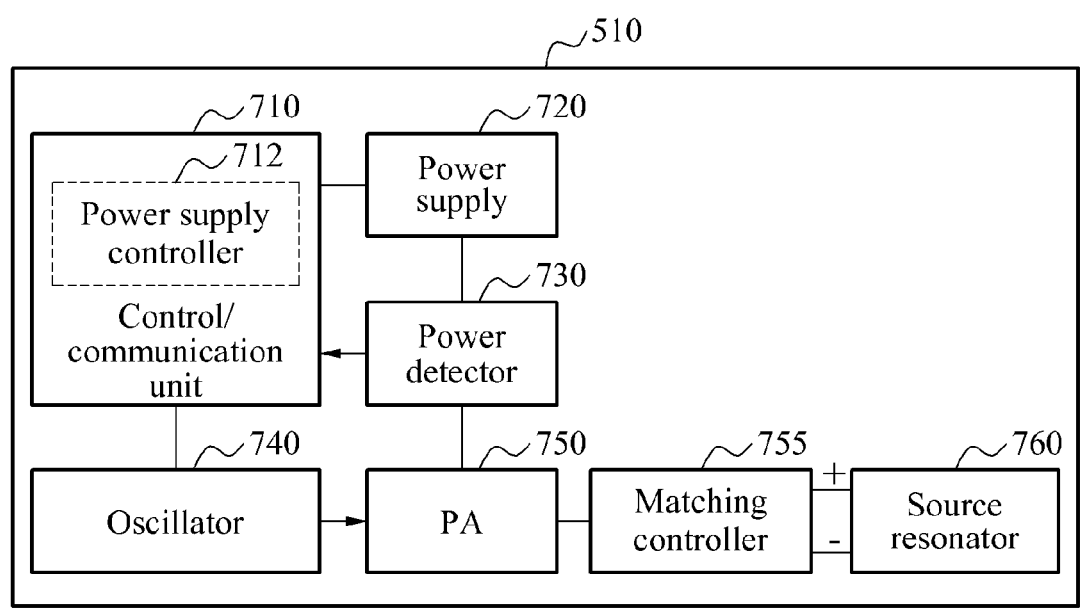
FIG. 7 is a diagram illustrating an example of a source device.

FIG. 7 illustrates an example of a source device.

Referring to FIG. 7, source device 510 includes a control/communication unit 710, a power supply 720, a power detector 730, an oscillator 740, a PA 750, a matching controller 755, and a source resonator 760 (namely, a transmission (Tx) resonator).

The control/communication unit 710 may be, for example, the control/communication unit 115 of FIG. 1. The power supply 720 may be, for example, the power supply 112 and the AC/DC converter 111 of FIG. 1. Additionally, the power detector 730 may be, for example, the power detector 113 of FIG. 1. The PA 750 may be, for example, the power converter 114 of FIG. 1, and the source resonator 760 may be, for example, the source resonator 116 of FIG. 1.

The control/communication unit 710 may include a power supply controller 712. As another example, the source device 510 may further include the power supply controller 712.

The oscillator 740 may generate a signal with a frequency, for example, in a band of a few KHz to tens of MHz. The generated signal may be the switching pulse signal of FIG.

1. The signal generated by the oscillator 740 may be applied to the PA 750. The oscillator 740 may change the frequency of the signal, and a matching schematic. The control/communication unit 710 may control the oscillator 740 to change the frequency of the generated signal and the matching schematic.

The power supply 720 may be, for example, a switching mode power supply. The power supply controller 712 may control the power supply 720. The power supply controller 712 may control the power supply 720 to apply a supply power to the PA 750. The power applied to the PA 750 by the power supply 720 may be referred to as a "PA supply power." Additionally, the power supply controller 712 may control the power supply 720 to adjust a voltage that is applied to the PA 750 by the power supply 720. The voltage applied to the PA 750 by the power supply 720 may be referred to as a "PA supply voltage." In response to the power supply 720 adjusting the PA supply voltage, current supplied to the PA 750 may also be adjusted.

The PA 750 may be, for example, a variable switching amplifier. The PA 750 may be designed as a switching amplifier of an E-class. A power output by the PA 750 may be determined based on a frequency of a signal applied from the oscillator 740, and the supply power applied from the power supply 720. The power output by the PA 750 may be referred to as a "PA power". Additionally, a PA current may refer to a current that is supplied to the PA 750 while the power supply controller 712 controls the power supply 720. A PA voltage may refer to a voltage of the PA power.

The source resonator 760 may transmit, to the target device 520, the PA power as an electromagnetic energy.

The matching controller 755 may perform impedance matching between the PA 750 and the source resonator 760. The matching controller 755 may be, for example, a matching circuit. The matching controller 755 may change a matching impedance and a matching frequency. The control/communication unit 710 may control the matching controller 755 to change a matching impedance and a matching frequency. The power detector 730 may detect a current and voltage of the supply power output by the power supply 720, and may transmit information about the detected current and the detected voltage to the control/communication unit 710. For example, the power detector 730 may detect either the PA power, or the PA current and the PA voltage, and may transmit information about the detected PA power, or the detected PA current and the detected PA voltage, to the control/communication unit 710. Additionally, the power detector 730 may monitor power supplied to the target device 520 by detecting a change in a load and a change in a mode of the target device 520. The power detector 730 may use the detected change in the load and the detected change in the mode to demodulate a modulated load of the target device 520.

Figure 8:
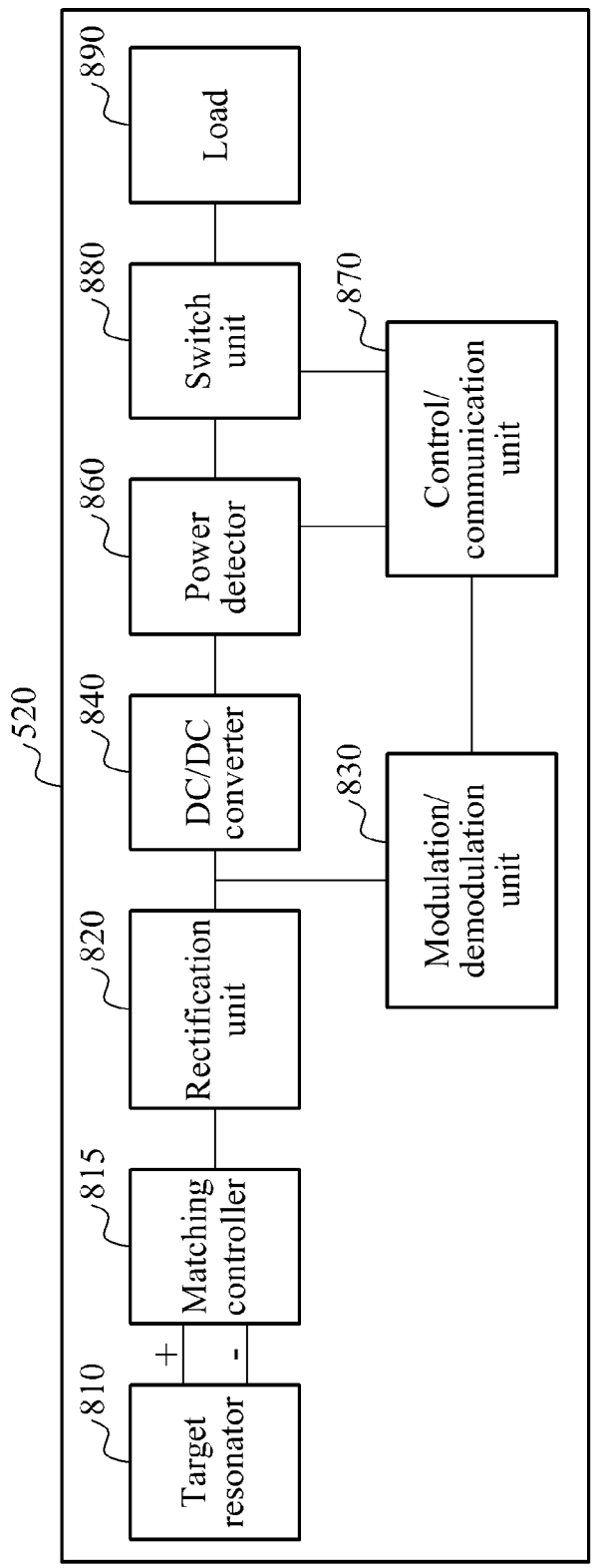
FIG. 8 is a diagram illustrating an example of a target device.

FIG. 8 illustrates an example of a target device.

As illustrated in FIG. 8, the target device 520 includes a target resonator 810, a matching controller 815, a rectification unit 820, a modulation and demodulation (modulation/demodulation) unit 830, a DC/DC converter 840, a power detector 860, a control/communication unit 870, a switch unit 880, and a load 890.

The target resonator 810, the rectification unit 820, the DC/DC converter 840, the control/communication unit 870, the switch unit 880, and the load 890 may be, for example, the target resonator 121, the rectification unit 122, the DC/DC converter 123, the control/communication unit 126, the switch unit 124, and the charging unit 125 of FIG. 1, respectively.

The target resonator 810 may receive electromagnetic energy from the source resonator 760 of the source device 510. For example, the target resonator 810 may receive power from the source device 510 through magnetic coupling with the source resonator 760. The received power may be used as a communication power and/or a charging power. Additionally, the target resonator 810 may receive various messages from the source device 510 through in-band communication.

The matching controller 815 may perform impedance matching between the target resonator 810 and the rectification unit 820. The matching controller 815 may be, for example, a matching circuit. For example, the matching controller 815 may change a matching impedance and a matching frequency. The control/communication unit 870 may control the matching controller 815 to change a matching impedance and a matching frequency.

The rectification unit 820 may generate a DC voltage by rectifying an AC voltage that is output from the target resonator 810. In other words, the rectification unit 820 may rectify the AC voltage received via the target resonator 810.

The DC/DC converter 840 may adjust a level of the DC voltage output from the rectification unit 820, based on a capacitance of the load 890. For example, the DC/DC converter 840 may adjust the level of the DC voltage output from the rectification unit 820 from 3 volts to 10 volts.

The power detector 860 may detect an output power and an output voltage of the DC/DC converter 840. The power detector 860 may transfer the detected output power and the detected output voltage to the control/communication unit 870.

The switch unit 880 may be turned on or off, under the control of the control/communication unit 870. For example, if the target device 520 or the load 890 is completely charged, the switch unit 880 may be turned off. If the switch unit 880 is turned off, the control/communication unit 710 of the source device 510 may detect a power received by the target device 520. The power received by the target device 520 may be referred to as a "received power." In other words, if the switch unit 880 is turned off, a magnetic coupling between the source resonator 760 and the target resonator 810 may be prevented.

The load 890 may include, for example, a battery. The load 890 may include the charging unit 125 of FIG. 1. The load 890 may be charged using a DC voltage that is output from the DC/DC converter 840.

The control/communication unit 870 may perform in-band communication with the source device 510, for example, using a resonant frequency. To perform the in-band communication, the control/communication unit 870 may use the modulation/demodulation unit 830. For example, the control/communication unit 870 may include the modulation/demodulation unit 830, and a function of the modulation/demodulation unit 830 may be performed by the control/communication unit 870.

The modulation/demodulation unit 830 may detect a signal that is transmitted between the target resonator 810 and the rectification unit 820, or detect an output signal of the rectification unit 820, and may demodulate a signal received by the target device 520. For example, the modulation/demodulation unit 830 may demodulate the signal received by the target device 520 through the in-band communication. Additionally, the modulation/demodulation unit 830 may demodulate a signal to be transmitted to the source device 510, by adjusting an impedance of the target resonator 810, or by turning on or off the switch unit 880.

Figure 9:
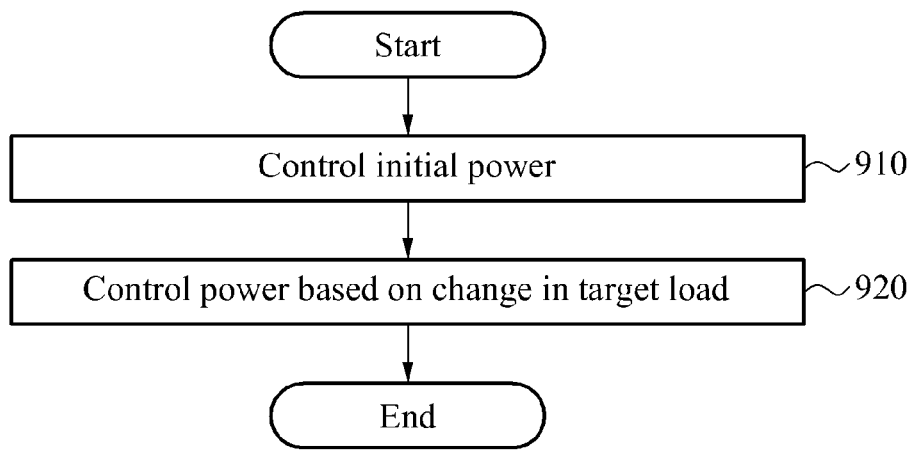
FIG. 9 is a flowchart illustrating an example of a power control method of a wireless power transmission and charging system.

FIG. 9 illustrates an example of a power control method of a wireless power transmission and charging system.

Referring to FIG. 9, in 910, an initial power is controlled. The controlling of the initial power control may refer to controlling and wirelessly transmitting power when the source device 510 and the target device 520 start connection. To appropriately transmit power used by the target device 520 to the target device 520, the power may be transmitted based on a difference in an efficiency of wireless power transmission between the source resonator 760 and the target resonator 810.

For example, the power used by the target device 520 may be used to charge the load 890 of the target device 520. For example, the power used by the target device 520 may be a power desired by the target device 520, a power required by the target device 520, a power recommended for the target device 520, a power to be used by the target device 520, a power requested by the target device 520, and the like.

In 920, power is controlled based on a change in a target load. For example, the target load may refer to a load measured in an output end of the PA 750, that is, a load applied to the output end of the PA 750.

The target load may be changed due to a change in a number of target devices that are being charged by a source device, or due to a change in a battery charging mode of a target device. For example, if the battery charging mode is changed from a constant current (CC) mode to a constant voltage (CV) mode, the target load may be changed. The controlling of power based on the change in the target load may refer to controlling power matched to a changed load and transmitting the controlled power.

Figure 10:
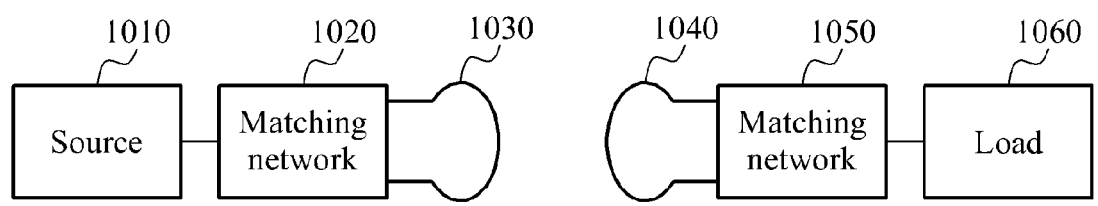
FIG. 10 is a diagram illustrating examples of power control conditions.

FIG. 10 illustrates examples of power control conditions.

FIG. 10 is another example of the source device 510 and the target device 520 of FIG. 5.

In FIG. 10, a source 1010 may correspond to elements of the source device 510. Additionally, a matching network 1020 may correspond to the matching controller 755, and a resonator 1030 may correspond to the source resonator 760.

A resonator 1040, a matching network 1050, and a load 1060 may correspond to the target resonator 810, the matching controller 815, and the load 890, respectively.

To supply a power to a target load (for example, the target device 520 or the load 890 in the target device 520), the source device 510 may control a PA power, or a source power. The source device 510 may control the PA supply power, and may control the PA power.

To control the PA power, the source device 510 may detect an efficiency of wireless power transmission between the source resonator 760 and the target resonator 810, and may transmit an output power adjusted based on the detected efficiency.

For example, if a low efficiency of wireless power transmission between the source resonator 760 and the target resonator 810 is detected, the source device 510 may transmit an increased amount of power to the target device 520, based on the low efficiency. In this example, if the PA power is high, heat may be generated in the source device 510, or in the target device 520, or between the source resonator 760 and the target resonator 810, and accordingly a reliability of each of the source device 510 and the target device 520 may be reduced. In other words, if the efficiency of wireless power transmission between the source resonator 760 and the target resonator 810 is detected as low, the source device 510 may not transmit the PA power to the target device 520.

Hereinafter, conditions used when the source device 510 controls power are described. To supply power to the target device 520, the PA 750 may output power that is matched to the target load. To output the power matched to the target load, the following two conditions may be satisfied.

First, an impedance matching condition may be satisfied. An impedance in a source side may satisfy a matching condition for a load impedance. The impedance in the source side may include, for example, an impedance of the source device 510 including the source resonator 760, and an impedance of the target resonator 810.

A value of a reflection coefficient may be used to determine whether the matching condition is satisfied. The reflection coefficient may be calculated by Equation 5.

$$\Gamma = \frac{V_r}{V_i} = \frac{Z_L - Z_o}{Z_L + Z_o} \quad \text{[Equation 5]}$$

In Equation 5, $\Gamma$ denotes a reflection coefficient. $V_i$ denotes an incident wave, and $V_r$ denotes a reflected wave. $Z_o$ denotes a source impedance, and $Z_L$ denotes a load impedance.

Second, a resonant frequency condition between the source device 510 and the target device 520 may be satisfied. The source device 510 and the target device 520 may have the same resonant frequency.

Figure 11:
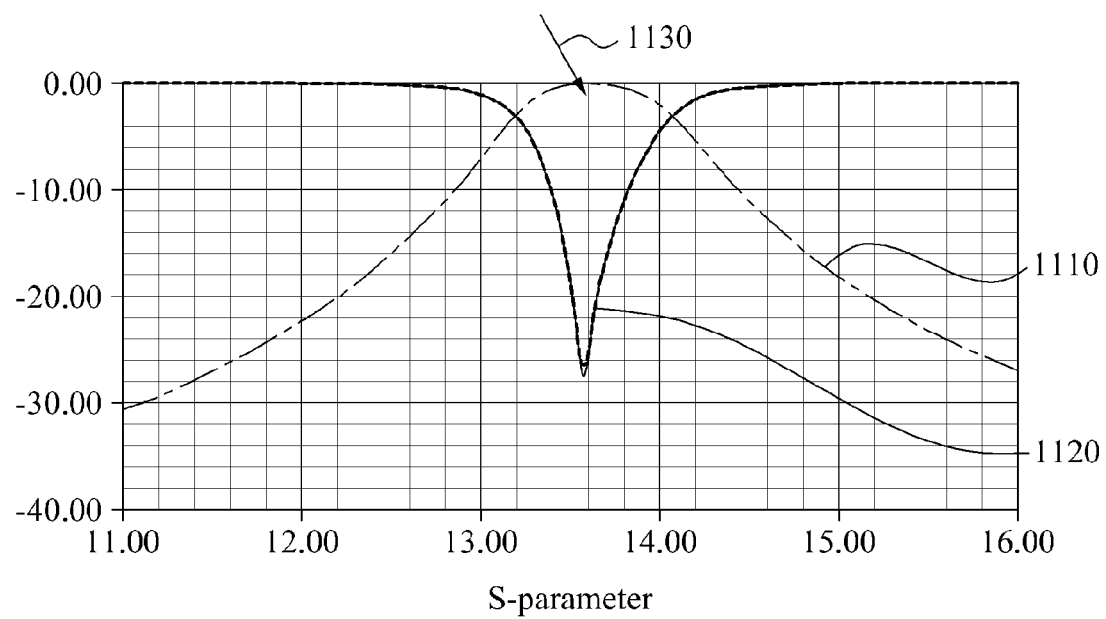
FIG. 11 is a diagram illustrating an example of a maximum efficiency point.

FIG. 11 illustrates an example of a maximum efficiency point.

A graph 1100 of FIG. 11 shows a maximum efficiency point 1130. In the graph 1100, an x-axis represents a frequency and a y-axis represents an S-parameter.

The source resonator 760 and the target resonator 810 may be manufactured differently for each manufacturer. For example, a difference in manufacturing may cause a difference in an efficiency of wireless power transmission between the source resonator 760 and the target resonator 810.

A coupling efficiency for wireless charging may refer to an efficiency of wireless power transmission from the source resonator 760 to the target resonator 810. To transmit power to the target device 520, the source device 510 may check the coupling efficiency. The source device 510 may transmit power adjusted based on the coupling efficiency.

The coupling efficiency may be measured using a vector network analyzer (VNA). For example, to measure the S-parameter, an RF input end (for example, an output end of the PA 750, or an input end of the source resonator 760) may be connected to a first terminal of the VNA, and an RF receiving end (for example, an output end of the target resonator 810, or an input end of the rectification unit 820) may be connected to a second terminal of the VNA.

If an output power of the VNA is denoted by $P_{input}$, an input power that is input to the RF input end may be represented by Equation 6 below. An output power that is output to the RF receiving end may be represented by Equation 7 below. A loss may be represented by Equation 8 below.

$$\text{Input power} = P_{input} \times (1 - |S11|^2) \quad \text{[Equation 6]}$$

$$\text{Output power} = P_{input} \times |S21|^2 \quad \text{[Equation 7]}$$

$$\text{Loss} = P_{input} \times (1 - |S11|^2 - |S21|^2) \quad \text{[Equation 8]}$$

In Equations 6 through 8, S11 denotes an input to the first terminal of the VNA, and S21 denotes an input to the second terminal of the VNA.

Accordingly, the coupling efficiency may be defined by the S-parameter, as shown in the following Equations 9 and 10:

$$\text{Coupling efficiency} = |S21|^2 \qquad \text{[Equation 9]}$$

$$\text{Maximum possible coupling efficiency} = \frac{|S21|^2}{(1 - |S11|^2)} \qquad \text{[Equation 10]}$$

The maximum possible coupling efficiency refers to a coupling efficiency based on power that is reflected by the source resonator 760 and the target resonator 810.

Figure 12:
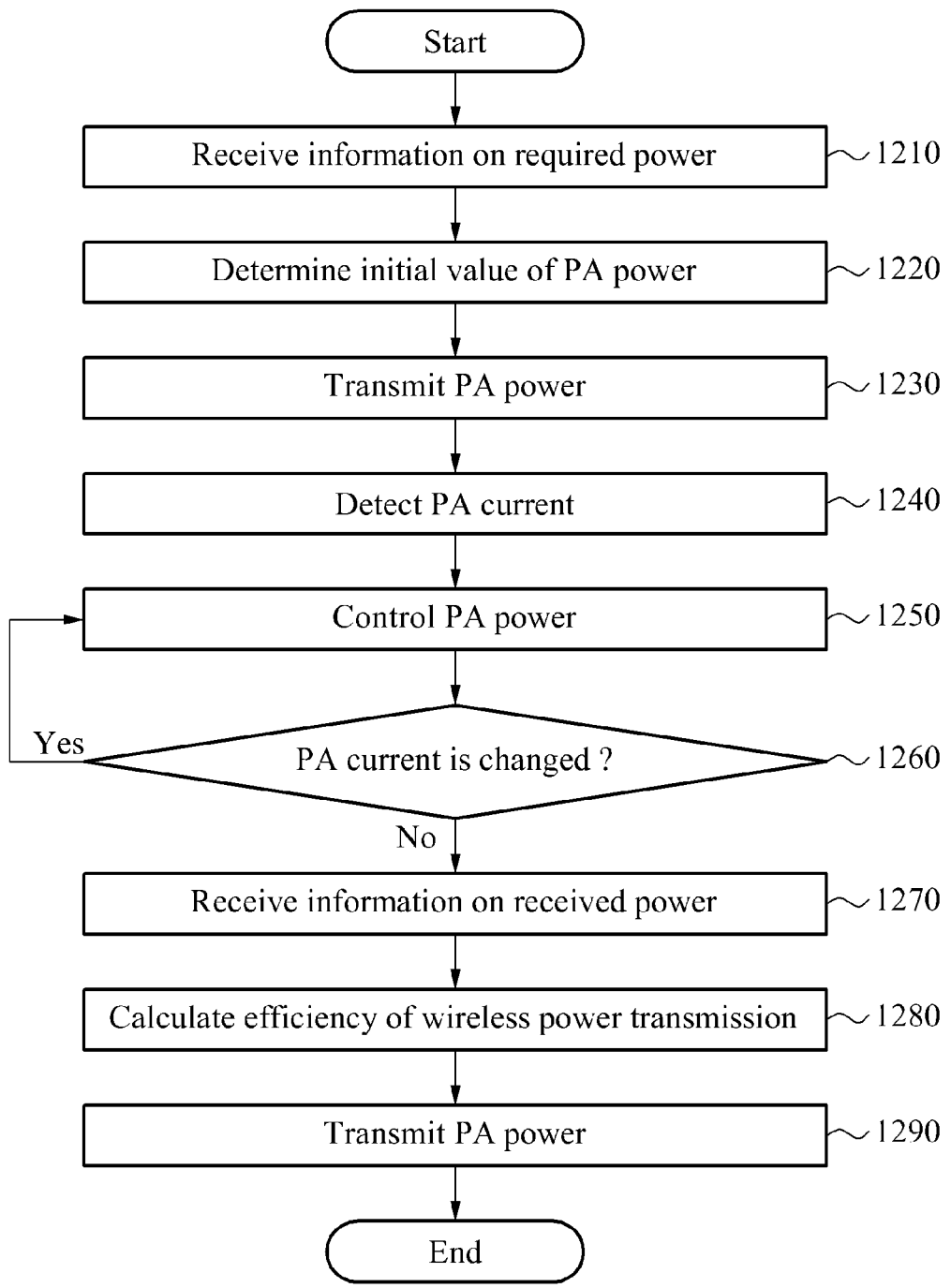
FIG. 12 is a flowchart illustrating an example of a method of detecting an efficiency of wireless power transmission.

FIG. 12 illustrates an example of a method of detecting an efficiency of wireless power transmission.

FIG. 12 illustrates an example in which the source device 510 detects an efficiency of wireless power transmission to the target device 520, and transmits an output power to the target device 520 based on the detected efficiency.

In 1210, the control/communication unit 710 receives, from the target device 520, information about power used by the target device 520. The power may be used to charge the load 890 of the target device 520. The information about the power may include, for example, information about the load 890 (for example, a battery), information about a voltage and current of the load 890, information about the target device 520, information about a power receiving capacity of the target device 520, information about a voltage and current of the target device 520, and the like.

In 1220, the control/communication unit 710 determines an initial value of a PA power that is to be output, based on the received information on the power used by the target device. The PA power with the initial value may be referred to as a "PA initial power." The source device 510 may recognize a power transferred to the target device 520, while monitoring the PA power.

In 1230, the control/communication unit 710, or the power supply controller 712 controls the power supply 720 to adjust the PA power based on the determined initial value, and the PA 750 transmits the adjusted PA power to the target device 520, for example, via the source resonator 760.

In 1240, the power detector 730 detects PA current (or PA power) output from the PA 750. In 1250, the control/communication unit 710 controls the PA power based on the detected PA current. In an example in which the detected PA current increases, the control/communication unit 710 may increase the PA power.

In 1260, the control/communication unit 710 determines whether the detected PA current has changed. In an example in which the detected PA current remains unchanged, operation 1270 may be performed. In another example in which the detected PA current is changed, operation 1250 may be performed again.

For example, if the PA current is determined to increase in 1260, the control/communication unit 710 may increase the PA power until the PA current becomes constant in 1250. In other words, the control/communication unit 710 may adjust the PA power based on the detected PA current. For example, the control/communication unit 710 may control the PA supply voltage, based on the efficiency of wireless power transmission between the source resonator 760 and the target resonator 810, until the PA current becomes constant. In other words, the PA supply voltage may be controlled based on the efficiency of wireless power transmission between the source resonator 760 and the target resonator 810.

In 1270, the control/communication unit 710 receives, from the target device 520, information about power received by the target device 520. In other words, the control/communication unit 710 may perform communication with the target device 520 in 1270.

In 1280, the control/communication unit 710 calculates the efficiency of the wireless power transmission, based on the adjusted PA power and the received power. For example, if a power of 3 W is received, and a PA power of 6 W is determined, an efficiency of 0.5 or 50% may be calculated.

In 1290, the control/communication unit 710, or the power supply controller 712 controls the power supply 720 to adjust the PA power based on the calculated efficiency. For example, in 1290, the control/communication unit 710, or the power supply controller 712 may control the PA supply voltage based on the calculated efficiency, and the PA 750 may transmit a PA power corresponding to the calculated efficiency to the target device 520 via the source resonator 760. If power is supplied to the PA 750 based on the load 890 of the target device 520, and if a low voltage or high current is set, high heat may be generated and a loss may be increased. In an example of output power of 10 W, if a voltage of 1 V and a current of 10 ampere (A) are set, high heat may be generated and a loss may be increased, in comparison to when a voltage of 10 V and current of 1 A are set. Accordingly, the control/communication unit 710, or the power supply controller 712 may control the PA power, or the PA supply voltage, based on a value of the PA current, in association with the efficiency.

If a change in current of the PA power falls within a predetermined range, the control/communication unit 710 may verify the power received by the target device 520 via a communication with the target device 520, in 1240 through 1290. The control/communication unit 710 may verify the efficiency of wireless power transmission between the source resonator 760 and the target resonator 810, using the PA power and the received power. The control/communication unit 710 may finally adjust a power used to charge the target device 520 or the load 890, based on the verified efficiency, and may transmit the adjusted power to the target device 520.

To transmit the power used to charge the target device 520 or the load 890, the control/communication unit 710 may determine a charging state of the target device 520 or the load 890 (that is, a change in the load 890), based on the detected PA current. Accordingly, in some examples operation 1270 may be skipped. The control/communication unit 710 may calculate the efficiency of the wireless power transmission, based on the adjusted PA power and the information on the power used by the target terminal in 1280, by skipping operation 1270.

Hereinafter, examples of a method of detecting an efficiency of wireless power transmission and controlling a power based on the detected efficiency are described.

Figure 13:
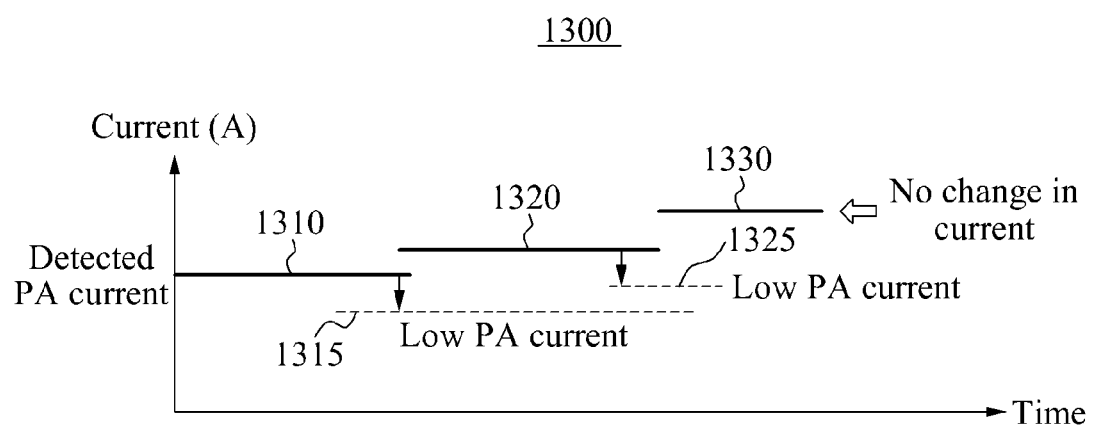
FIG. 13 is a diagram illustrating an example of detecting a change in an efficiency of wireless power transmission between resonators.

FIG. 13 illustrates an example of detecting a change in an efficiency of wireless power transmission between resonators.

In a graph 1300 of FIG. 13, an x-axis represents time and a y-axis represents current.

If a power used by the load 890 (for example, a battery) is not supplied during charging of the load 890, a load greater than the load 890 may be measured in the output end of the PA 750. If a low current is detected in the PA 750, the control/communication unit 710 may determine that power is not enough to charge the target device 520, and may control the power supply 720, and the PA 750 may transmit greater power. As illustrated in FIG. 13, if the control/communication unit 710 determines that low PA current is detected, the PA current may increase gradually from a level 1310 to a level 1330. If the PA current reaches the level 1330, the PA current may not be changed.

As described herein, the control/communication unit 710 may repeatedly perform operations 1240 and 1270, until an appropriate amount of power is transferred to the target device 520.

To supply the power to the load 890, the PA power may be controlled based on the PA current. The control/communication unit 710 may determine a power control condition, based on an increase or decrease in the PA current. For example, if a power is supplied to the PA 750 during controlling of the PA power, and if the load 890 is small in comparison to the supplied power, the PA current may increase. An increase in the PA current may indicate a lack of the power supplied to the load 890. Accordingly, the control/communication unit 710 may control the PA power based on a result of detecting the PA current. If the PA current no longer increases, the control/communication unit 710 may determine that a required amount power is supplied to the load 890, and may not increase the PA power any more.

Figure 14:
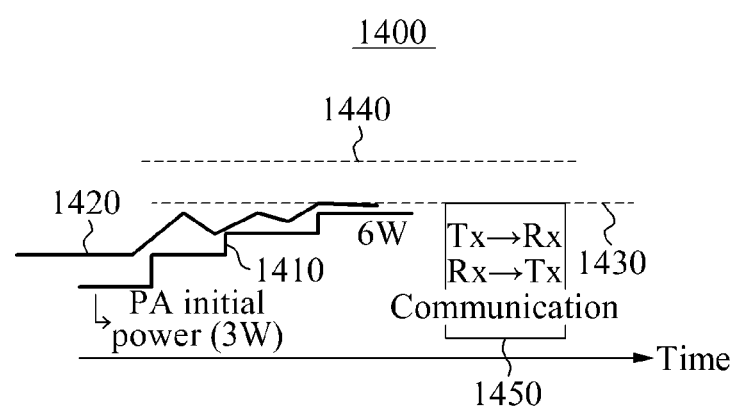
FIG. 14 is a diagram illustrating an example of adjustment of a power output by a power amplifier (PA).

FIG. 14 illustrates an example of adjustment of a PA power.

FIG. 14 illustrates an example of a change in a PA power 1410 (namely, a level of controlled PA supply voltage), and a detected PA current 1420. In this example, a dotted line 1430 indicates a power used by the target device 520, and a dotted line 1440 indicates a maximum level of PA power. A box 1450 indicates a communication that is performed between the source device 510 and the target device 520. For example, the power used by the target device 520 may be a requested amount of power to be used, a desired amount of power, a recommended amount of power, a required amount of power, and the like.

In 1210 and 1220, the PA initial power may be determined. For example, the target device 520 may require a power of 3 W, as indicated by the dotted line 1430. If the efficiency of wireless power transmission between the source resonator 760 and the target resonator 810 is assumed to be 100%, the control/communication unit 710 may determine the PA initial power to be 3 W in 1220.

The efficiency assumed in 1220 may be referred to as an "assumed efficiency." For example, the assumed efficiency may be determined based on an application of the target device 520, a function of the target device 520, an operating environment of the wireless power transmission and charging system 500 of FIG. 5, and the like. As an example, the assumed efficiency may range from 50% to 100%.

The PA current detected in 1240 may gradually increase. In 1250, the control/communication unit 710 may control the PA power so that power may be transferred to the load 890 of the target device 520.

The control/communication unit 710 may verify the power supplied to the load 890, for example, based on the PA supply power, or the PA supply voltage and the PA supply current, which are detected by the power detector 730.

Figure 15:
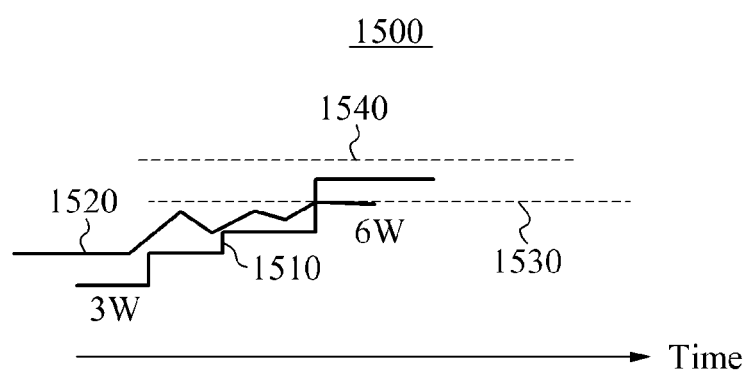
FIG. 15 is a diagram illustrating an example of adjusting a current supplied to the PA.

FIG. 15 illustrates an example of adjusting a PA current.

FIG. 15 illustrates an example of a change in a PA power 1510 (namely, a level of controlled PA supply voltage), and a detected PA current 1520. Additionally, a dotted line 1530 indicates a power used by the target device 520, and a dotted line 1540 indicates a maximum level of PA power.

The PA 750 may output only the same power as the load 890 of the target device 520. For example, if the load 890 remains unchanged, the PA current may hardly change, despite an increase in the PA supply voltage.

The PA current 1520 may become constant at a predetermined point, even if the PA supply voltage is controlled and the PA power 1510 is increased.

The control/communication unit 710 may determine whether the target device 520 is charged, through operations 1240 and 1270. If it is determined that the used power (for example, a required voltage and required current) is supplied, the control/communication unit 710 may be changed to a charging mode, and may transmit power to the target device 520.

In FIG. 15, a PA power of 6 W is transmitted from the source device 510 to the target device 520, and a power of 3 W indicated by the dotted line 1530 is transferred to the load 890. Accordingly, an efficiency of wireless power transmission is assumed to be 50%.

Figure 16:
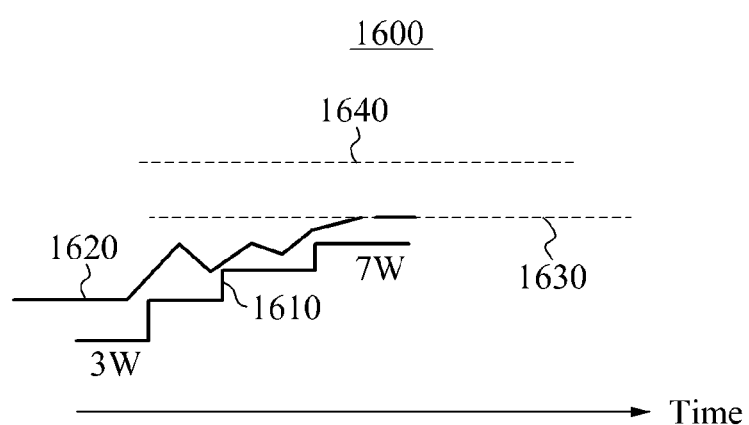
FIG. 16 is a diagram illustrating an example in which power transmission is blocked due to a low efficiency of wireless power transmission.

FIG. 16 illustrates an example in which power transmission is blocked due to a low efficiency of wireless power transmission.

FIG. 16 illustrates an example of a change in a PA power 1610 (namely, a level of controlled PA supply voltage), and a detected PA current 1620. Additionally, a dotted line 1630 indicates a power used by the target device 520, and a dotted line 1640 indicates a maximum level of PA power.

For example, if it is difficult to transmit power due to a low efficiency of wireless power transmission between the source resonator 760 and the target resonator 810, the source device 510 may transmit a PA power of 7 W to the target device 520, a power of 3 W indicated by the dotted line 1630 may be transferred to the load 890. Accordingly, the efficiency of wireless power transmission may be, for example, 42.8%.

Figure 17:
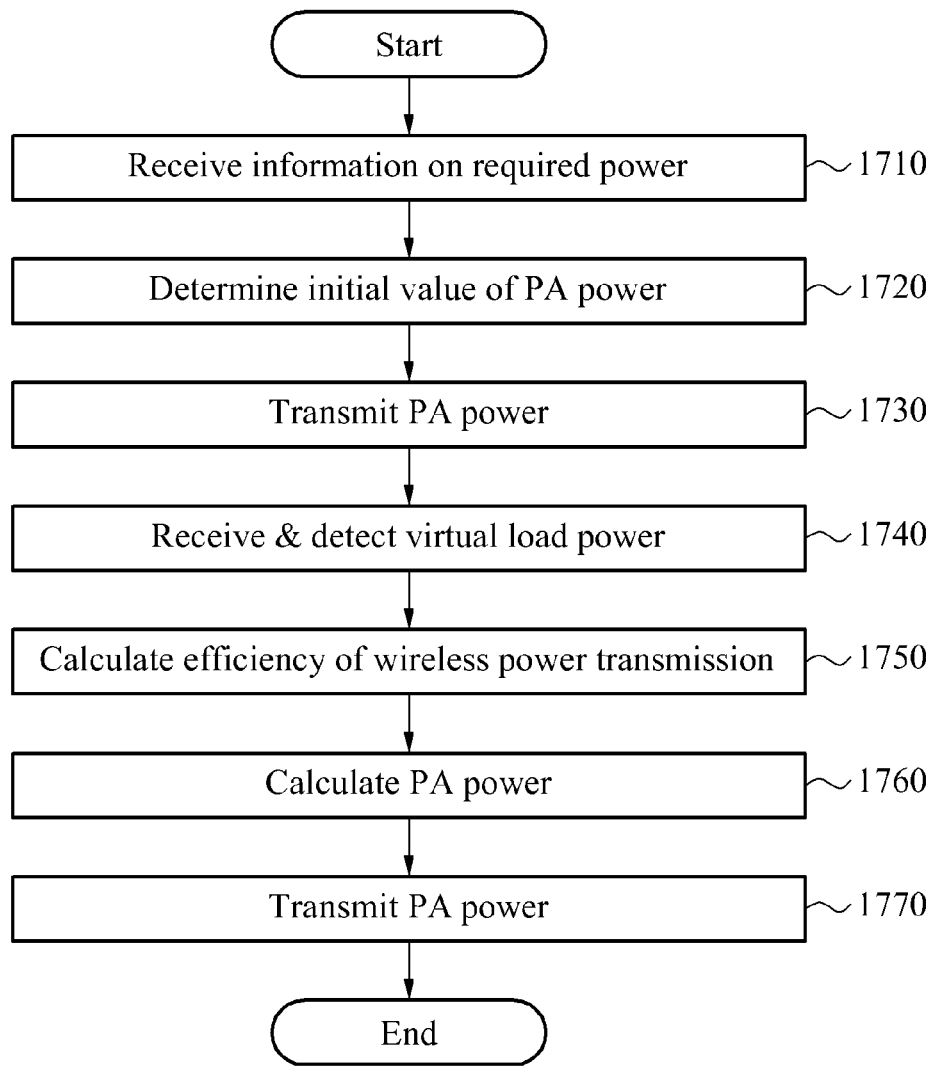
FIG. 17 is a flowchart illustrating an example of a method of detecting an efficiency of wireless power transmission using a virtual load.

FIG. 17 illustrates an example of a method of detecting an efficiency of wireless power transmission using a virtual load.

FIG. 17 illustrates another example in which the source device 510 detects an efficiency of wireless power transmission to the target device 520, and transmits an output power to the target device 520 based on the detected efficiency.

For example, to detect the efficiency of wireless power transmission between the source resonator 760 and the target resonator 810, the control/communication unit 710 may use information received from the target device 520. The information may be generated based on a power that is flowing in the target device 520, or based on a power received by the target device 520. In this example, the information may be associated with a power that is flowing in a virtual load of the target device 520. The power flowing in the virtual load may be referred to as a "virtual load power."

The virtual load may refer to, for example, a load with the same value as the load 890 of the target device 520, or a load with a resistance value used as a reference between the source device 510 and the target device 520. The resistance value may be referred to as a "reference load."

Operations 1710 and 1720 correspond to operations 1210 and 1220, respectively. Additionally, operation 1730 corresponds to operation 1230, or operations 1230 through 1260. Accordingly, the example described with reference to FIG. 12 may be applied to the example illustrated in FIG. 17.

In 1740, the target device 520 receives and detects a virtual load power. In this example, the target device 520 may transmit information about the detected virtual load power to the source device 510. The source device 510 may receive the information about the detected virtual load power.

In 1750, the control/communication unit 710 calculates the efficiency of the wireless power transmission, by comparing the PA power with the virtual load power.

In 1760, the control/communication unit 710 calculates the PA power based on the calculated efficiency.

In 1770, the control/communication unit 710, or the power supply controller 712 controls the power supply 720 such that the calculated PA power is output. By controlling the power supply 720, the PA power may be adjusted. The PA 750 may transmit the adjusted PA power to the target device 520 via the source resonator 760.

Figure 18:
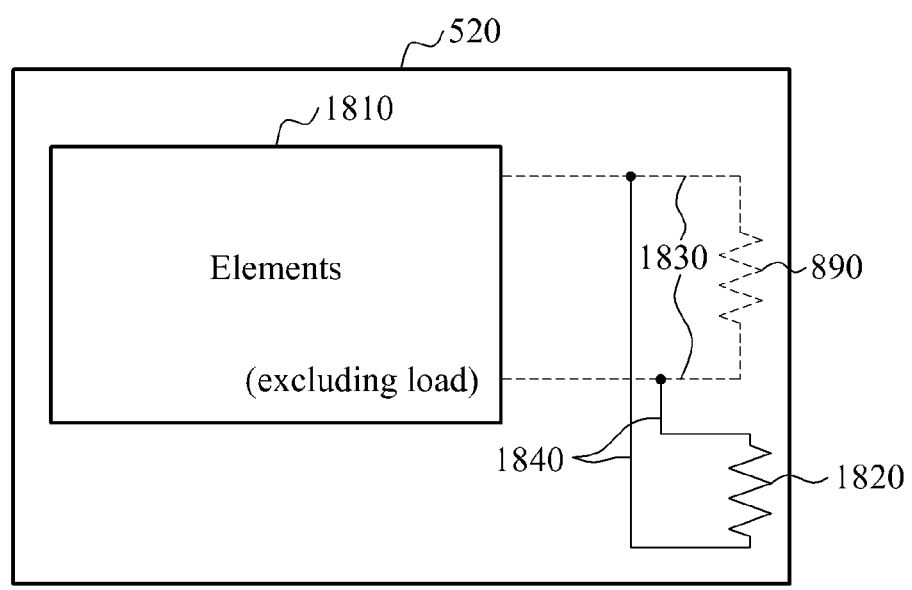
FIG. 18 is a diagram illustrating an example of a connection of a virtual load.

FIG. 18 illustrates an example of connection of a virtual load.

FIG. 18 depicts elements 1810 excluding a load from the target device 520. Additionally, a virtual load 1820 is connected in parallel to the load 890.

For example, the target device 520, or the control/communication unit 870 may use a path control to select either a path 1830 connected to the load 890, or a path 1840 connected to the virtual load 1820. If a path of a received power is changed to the path 1840 by path selection, the power detector 860 may detect a power flowing in the virtual load 1820, and may transmit the detected power to the control/communication unit 870. The control/communication unit 870 may transmit the received power to the source device 510.

Figure 19:
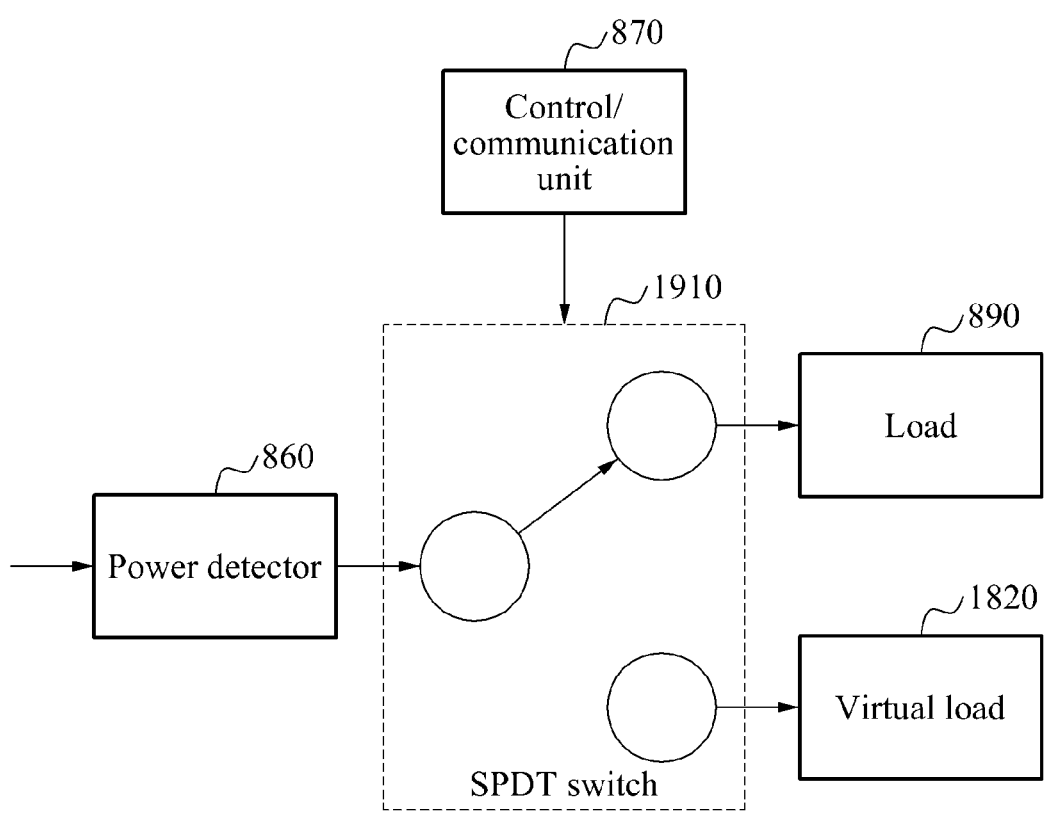
FIG. 19 is a diagram illustrating an example of path selection using a single pole double throw (SPDT) switch.

FIG. 19 illustrates an example of path selection using a single pole double throw (SPDT) switch.

Referring to FIG. 19, an SPDT switch 1910 may transfer power transmitted from the power detector 860 to either the load 890, or the virtual load 1820. The switch unit 880 may include the SPDT switch 1910.

The SPDT switch 1910 may select either the load 890, or the virtual load 1820, to transfer the transmitted power, based on the control of the control/communication unit 870. If the SPDT switch 1910 is connected to virtual load 1820, the power detector 860 may detect the power flowing in the virtual load 1820, and may transmit the detected power to the control/communication unit 870.

Figure 20:
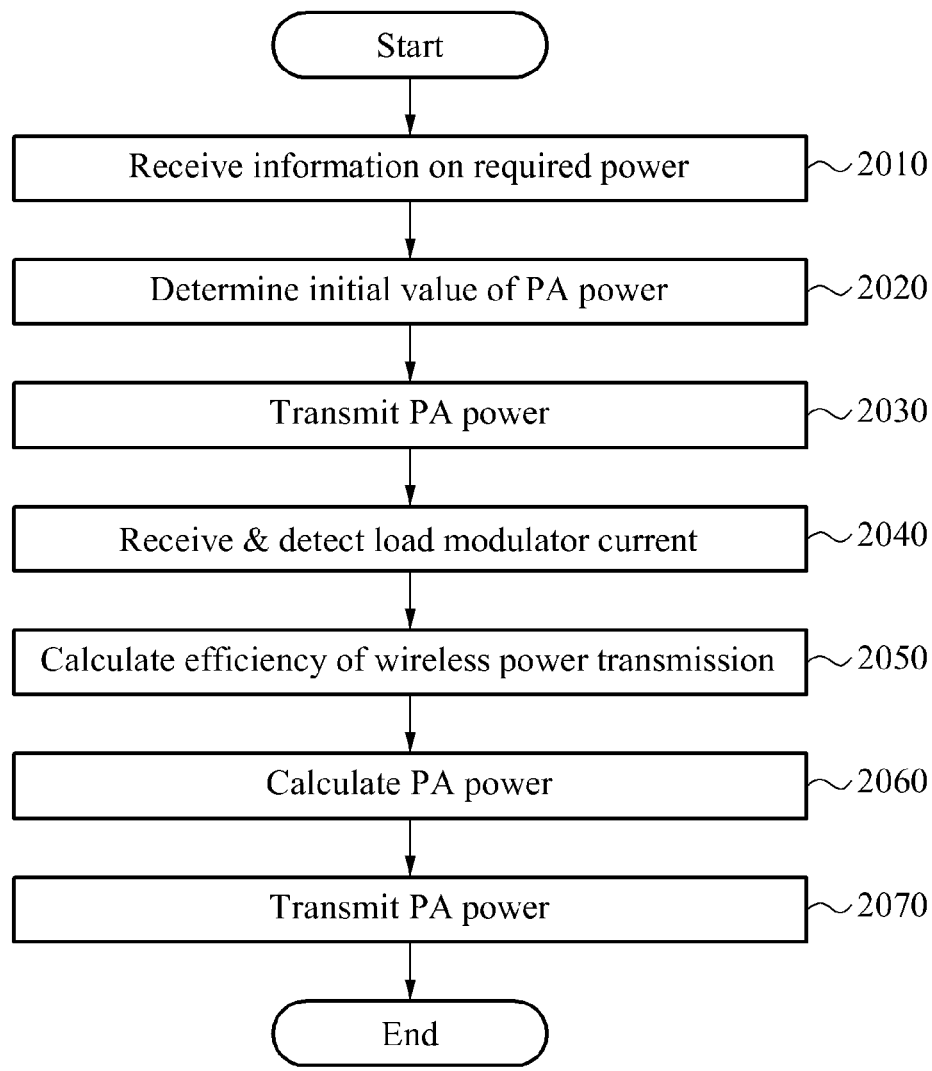
FIG. 20 is a flowchart illustrating an example of a method of detecting an efficiency of wireless power transmission using a load fluctuation.

FIG. 20 illustrates an example of a method of detecting an efficiency of wireless power transmission using a load fluctuation.

FIG. 20 illustrates another example in which the source device 510 detects an efficiency of wireless power transmission to the target device 520, and transmits an output power to the target device 520 based on the detected efficiency.

For example, to detect the efficiency of wireless power transmission between the source resonator 760 and the target resonator 810, the control/communication unit 710 may use information received from the target device 520. The information may be generated based on power flowing in the target device 520. In this example, the information may be associated with a current flowing in a load modulator 2100 of the target device 520 that is further described later herein. The current flowing in the load modulator 2100 may be referred to as a "load modulator current," and a power flowing in the load modulator 2100 may be referred to as a "load modulator power."

Operations 2010 and 2020 correspond to operations 1210 and 1220, respectively. Additionally, operation 2030 corresponds to operation 1230, or operations 1230 through 1260. Accordingly, the example described with reference to FIG. 12 may be applied to the example illustrated in FIG. 20.

In 2040, the target device 520 receives and detects the load modulator current. In this example, the target device 520 may transmit information about the load modulator current to the source device 510. The source device 510 may receive the information about the load modulator current.

In 2050, the control/communication unit 710 calculates the efficiency of the wireless power transmission, based on the PA power and the load modulator current. For example, the control/communication unit 710 may compare the PA power with the power received by the target device 520, based on the load modulator current, and may calculate the efficiency of wireless power transmission.

Operations 2060 and 2070 correspond to operations 1760 and 1770, respectively, and accordingly the example described with reference to FIG. 17 may be applied to the example illustrated in FIG. 20.

Figure 21:
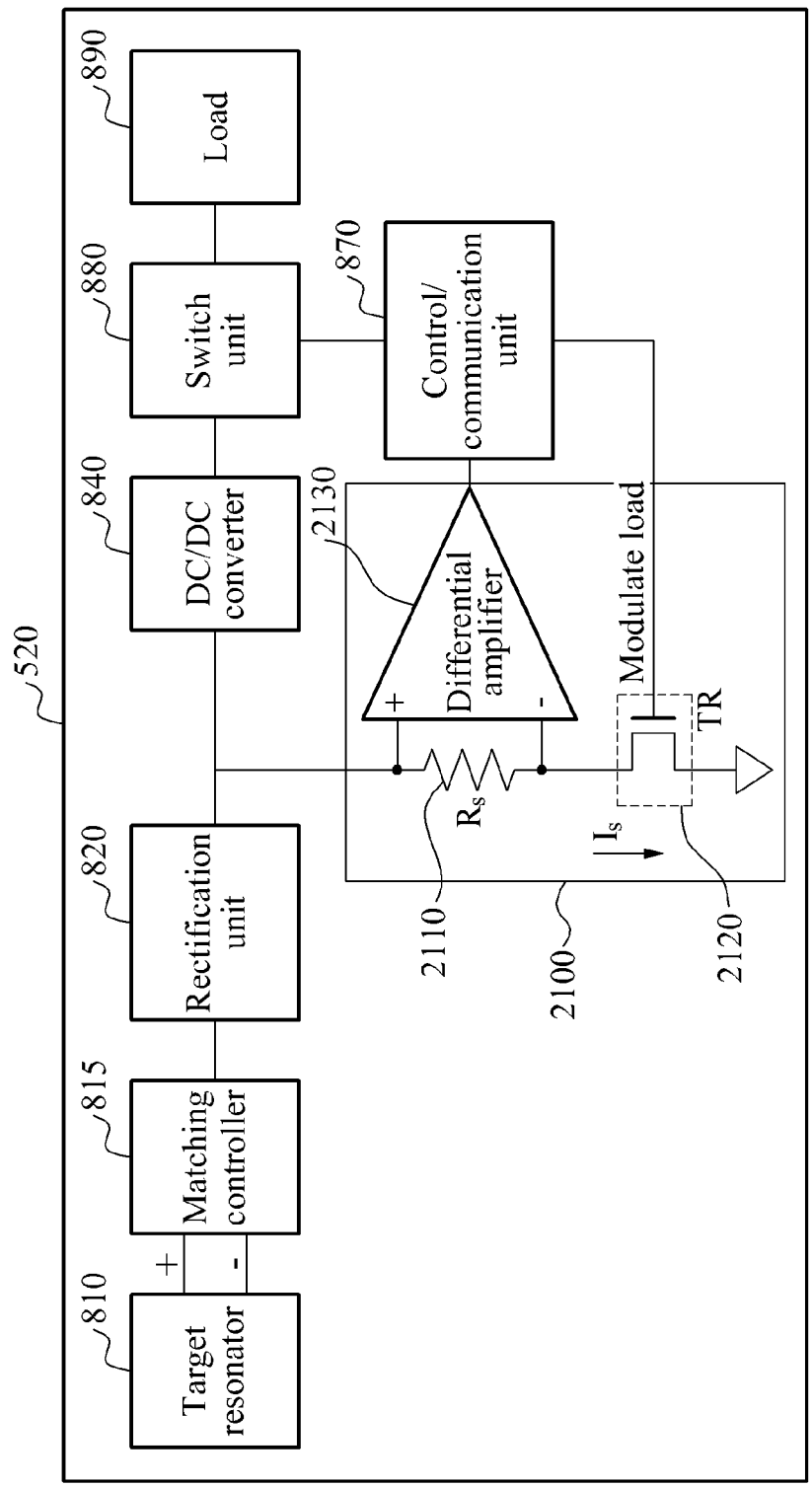
FIG. 21 is a diagram illustrating an example of detecting a power flowing in a load modulator.

FIG. 21 illustrates an example of detecting a load modulator power.

Referring to FIG. 21, the load modulator 2100 may receive, from the rectification unit 820, the power received by the target device 520. If a path connected to the load 890 is blocked off, the load modulator 2100 may be turned on, and the received power may be input to the load modulator 2100. In other words, the load modulator power may refer to a power output from the rectification unit 820 in a state in which the path connected to the load 890 is blocked. Additionally, load modulator current $I_s$ may refer to current that is flowing in the target device 520 in the state in which the path connected to the load 890 is blocked.

As illustrated in FIG. 21, the load modulator 2100 includes a resistor 2110, a transistor 2120, and a differential amplifier 2130. For example, the resistor 2110 may be a load of the load modulator 2100.

The load modulator power may be detected using the load modulator current $I_s$ that is flowing in the resistor 2110. The control/communication unit 870 may control the transistor 2120 to turn on the load modulator 2100. If the load modulator 2100 is turned on, the load modulator current $I_s$ may flow to the transistor 2120 via the resistor 2110. The differential amplifier 2130 may detect voltages that are applied to both ends of the resistor 2110, and may transmit the detected voltages to the control/communication unit 870. Because a resistance value of the resistor 2110, and the voltages applied to both the ends of the resistor 2110 may be verified, the control/communication unit 870 may calculate the load modulator current $I_s$ flowing in the resistor 2110, or the transistor 2120. Additionally, the control/communication unit 870 may transmit the calculated load modulator current $I_s$ to the source device 510.

Figure 22:
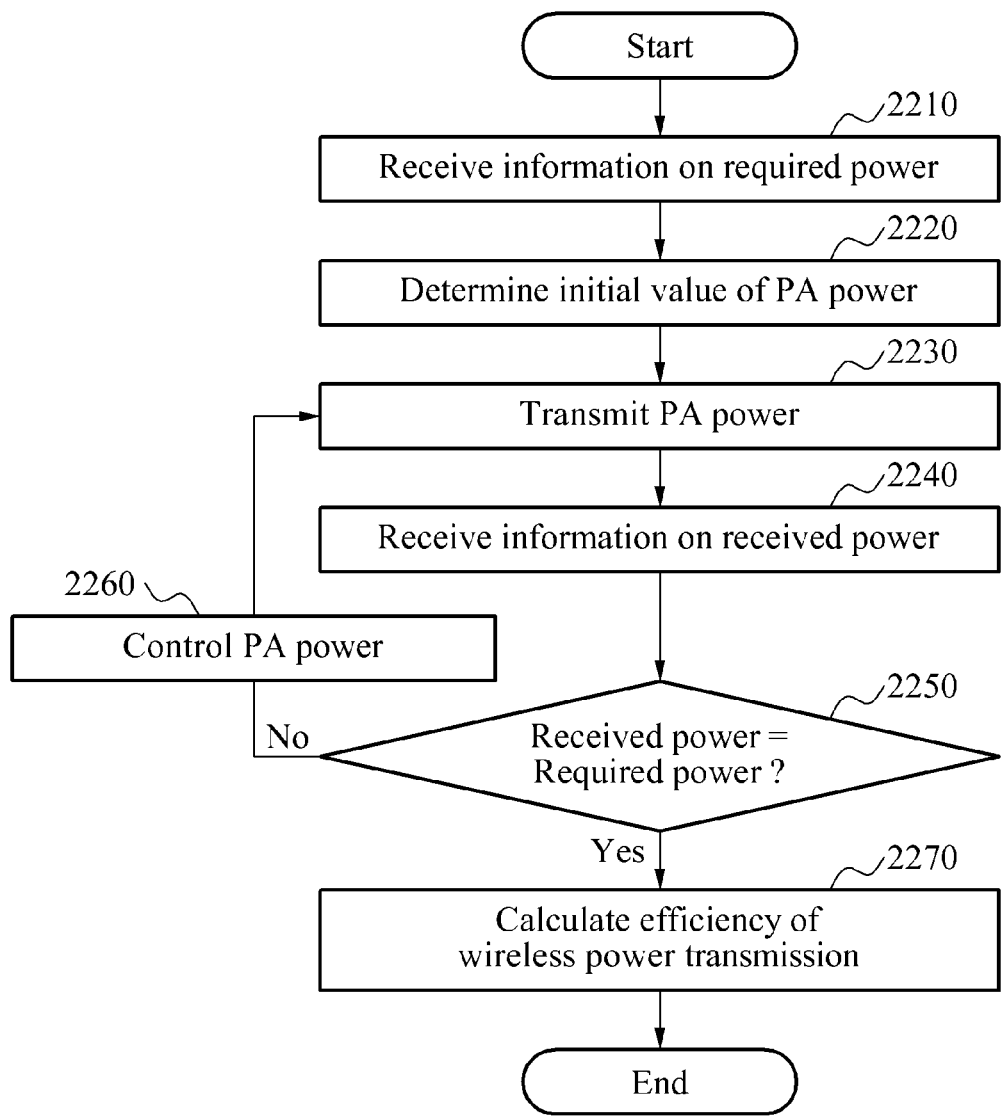
FIG. 22 is a flowchart illustrating an example of a method of detecting an efficiency of wireless power transmission based on a power received by a target device.

FIG. 22 illustrates an example of a method of detecting an efficiency of wireless power transmission based on a power received by a target device.

FIG. 22 illustrates yet another example in which the source device 510 detects an efficiency of wireless power transmission to the target device 520, and transmits an output power to the target device 520 based on the detected efficiency.

Referring to FIG. 22, to detect the efficiency of wireless power transmission between the source resonator 760 and the target resonator 810, the control/communication unit 710 may use information received from the target device 520. The information may be generated based on a power that is flowing in the target device 520. In this example, the information may be associated with a current flowing in the target device 520, a virtual load power, a load modulator current, and the like.

Operations 2210, 2220 and 2230 correspond to operations 1210, 1220, and 1230, respectively. Accordingly, the example described with reference to FIG. 12 may be applied to the example illustrated in FIG. 22.

In 2240, the control/communication unit 710 sends, to the target device 520, a request for information about the received power. In response to the request, the target device 520 may transmit the information about the received power to the source device 510. The control/communication unit 710 may receive the information about the received power from the target device 520.

In 2250, the control/communication unit 710 compares the received power with the power used by the target terminal. In an example in which the received power reaches desired amount of power, operation 2270 may be performed. In another example in which the received power is less than the desired power, operation 2260 may be repeatedly performed.

In 2260, the control/communication unit 710 controls the PA power, based on a result of operation 2250. For example, if the received power fails to reach the required power, the control/communication unit 710 may increase the PA power.

If the received power is low in comparison to the required power, the control/communication unit 710 may adjust the PA power to further transmit insufficient power, through operations 2250 and 2260. The control/communication unit 710 may recognize the increased received power by repeating operation 2240. In 2270, the control/communication unit 710 calculates the efficiency of the wireless power transmission, by comparing the PA power with the received power. Operations 2260 and 2270 may correspond to operations 1760 and 1770, respectively.

Figure 23:
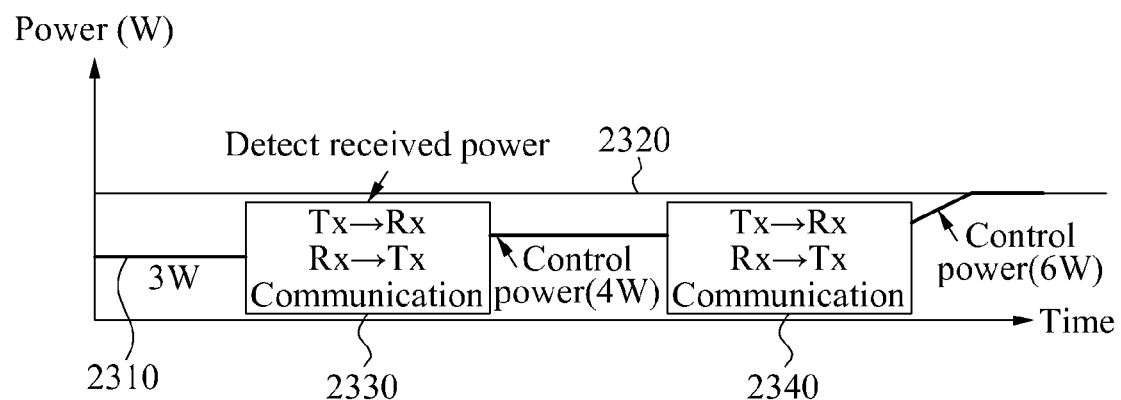
FIG. 23 is a diagram illustrating an example of controlling power based on a received power.

FIG. 23 illustrates an example of controlling power based on a received power.

FIG. 23 illustrates a PA power 2310, and a required power 2320. Because the required power 2320 is set to 3 W, a power of 3 W should be transmitted to the target device 520. Additionally, each of boxes 2330 and 2340 indicates a communication performed between the source device 510 and the target device 520.

The PA power 2310 has an initial value of 3 W. Through operations 2230 through 2250, the control/communication unit 710 may adjust the PA power 2310 to 4 W, and then to 6 W. If the PA power 2310 reaches 6 W, a power that is actually received by the target device 520 may reach the required power 2320, namely, 3 W.

Figure 24:
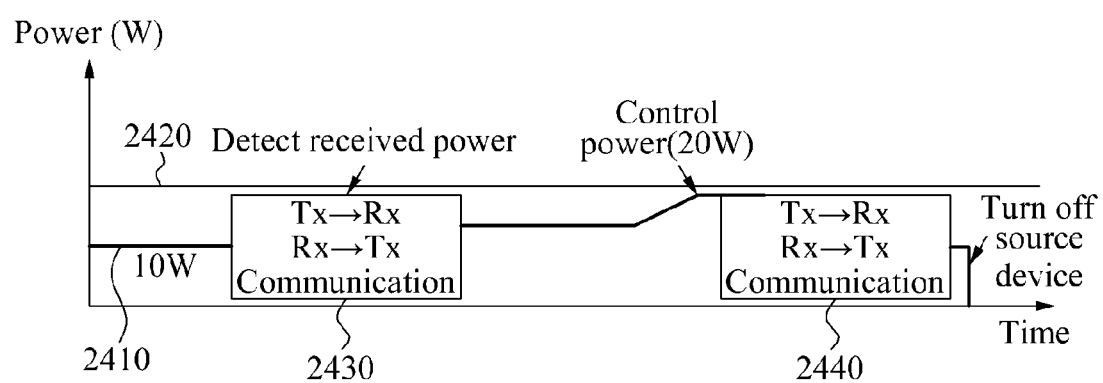
FIG. 24 is a diagram illustrating an example of controlling overpower.

FIG. 24 illustrates an example of controlling overpower.

The source device 510 and the target device 520 may be manufactured by various manufacturers. Because the manufacturers may manufacture the source device 510 and the target device 520 using different ways, the efficiency of wireless power transmission between the source resonator 760 and the target resonator 810 may vary depending on the manufacturers.

For example, the efficiency of wireless power transmission between the source resonator 760 and the target resonator 810 may be used as an index of an efficiency of wireless power transmission. If the efficiency of wireless power transmission is reduced, the source device 510 may transmit a high PA power, which may cause a problem in reliability of the source device 510. Additionally, due to heat that is generated within the source device 510, a product may be damaged, and energy may be wasted.

If a detected efficiency of wireless power transmission is lower than a reference efficiency, for example, the control/communication unit 710 may generate an alarm, or block transmission of a PA power, and may interrupt an operation of the source device 510.

Additionally, the above operations of the control/communication unit 710 may also be applied to an example in which a value of the PA current is equal to or greater than a set value. For example, an impedance of the load 890 may be changed due to a fluctuation in the PA supply voltage, or an external change. Due to a change in the impedance of the load 890, the value of the PA current may be increased above the set value. If the value of the PA current is equal to or greater than the set value, the control/communication unit 710 may generate an alarm, or block transmission of a PA power, and may interrupt the operation of the source device 510. The set value may be determined based on the PA power, and the efficiency of wireless power transmission.

FIG. 24 illustrates a PA power 2410, and a required power 2420. Because the required power 2420 is set to 10 W, a power of 10 W should be transmitted to the target device 520. Additionally, each of boxes 2430 and 2440 indicates a communication performed between the source device 510 and the target device 520.

Figure 25:
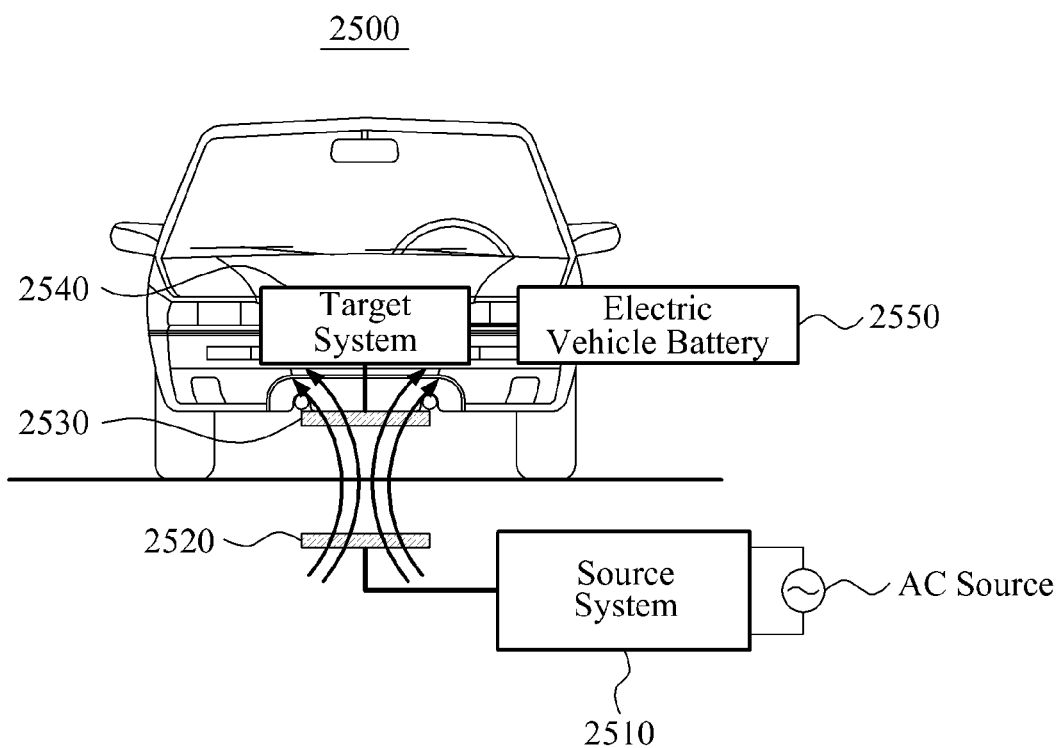
FIG. 25 is a diagram illustrating an example of an electric vehicle charging system.

FIG. 25 illustrates an example of an electric vehicle charging system.

Referring to FIG. 25, an electric vehicle charging system 2500 includes a source system 2510, a source resonator 2520, a target resonator 2530, a target system 2540, and an electric vehicle battery 2550.

The electric vehicle charging system 2500 may have a similar structure to the wireless power transmission and charging system of FIG. 1. The source system 2510 and the source resonator 2520 in the electric vehicle charging system 2500 may function as a source. Additionally, the target resonator 2530 and the target system 2540 in the electric vehicle charging system 2500 may function as a target.

The source system 2510 may include an AC/DC converter, a power detector, a power converter, a control/communication unit, similarly to the source device 110 of FIG. 1. The target system 2540 may include a rectification unit, a DC/DC converter, a switch unit, a charging unit, and a control/communication unit, similarly to the target device 120 of FIG. 1.

The electric vehicle battery 2550 may be charged by the target system 2540.

The electric vehicle charging system 2500 may use a resonant frequency in a band of a few kilohertz (KHz) to tens of MHz.

The source system 2510 may generate power, based on a type of charging vehicle, a capacity of a battery, and a charging state of a battery, and may supply the generated power to the target system 2540.

The source system 2510 may control the source resonator 2520 and the target resonator 2530 to be aligned. For example, when the source resonator 2520 and the target resonator 2530 are not aligned, the control/communication unit of the source system 2510 may transmit a message to the target system 2540, and may control alignment between the source resonator 2520 and the target resonator 2530.

For example, when the target resonator 2530 is not located in a position enabling maximum magnetic resonance, the source resonator 2520 and the target resonator 2530 may not be aligned. When a vehicle does not stop accurately, the source system 2510 may induce a position of the vehicle to be adjusted, and may control the source resonator 2520 and the target resonator 2530 to be aligned.

The source system 2510 and the target system 2540 may transmit or receive an ID of a vehicle, or may exchange various messages, through communication.

The descriptions of FIGS. 2 through 22 may be applied to the electric vehicle charging system 2500. However, the electric vehicle charging system 2500 may use a resonant frequency in a band of a few KHz to tens of MHz, and may transmit power that is equal to or higher than tens of watts to charge the electric vehicle battery 2550.

FIG. 25 illustrates an example of an electric vehicle charging system 2500. The electric vehicle charging system 2500 includes a source system 2510, a source resonator 2520, a target resonator 2530, a target system 2540, and an electric vehicle battery 2550.

The electric vehicle charging system 2500 may have a similar structure to the wireless power transmission system of FIG. 1. The source system 2510 and the source resonator 2520 in the electric vehicle charging system 2500 may function as a source device. Additionally, the target resonator 2530 and the target system 2540 in the electric vehicle charging system 2500 may function as a target device. The source device may correspond to the source device 110 of FIG. 1, and the target device may correspond to the target device 120 of FIG. 1.

The electric vehicle battery 2550 is charged by the target system 2540. The electric vehicle charging system 2500 may use a resonant frequency in a band of a few kilohertz (KHz) to tens of MHz.

The source system 2510 generates power based on a type of a charging vehicle, a capacity of a battery, and a charging state of the battery, and supplies the generated power to the target system 2540. The source system 2510 controls the source resonator 2520 and the target resonator 2530 to be aligned. For example, when the source resonator 2520 and the target resonator 2530 are not aligned, a controller of the source system 2510 may transmit a message to the target system 2540, and may control alignment between the source resonator 2520 and the target resonator 2530.

In another example, when the target resonator 2530 is not located in a position enabling maximum magnetic resonance, the source resonator 2520 and the target resonator 2530 may not be aligned. When a vehicle does not stop accurately, the source system 2510 may induce a position of the vehicle to be adjusted, and may control the source resonator 2520 and the target resonator 2530 to be aligned.

The source system 2510 and the target system 2540 transmit and/or receive an ID of a vehicle, exchange various messages through communication. The descriptions of FIGS. 1 through 22 may be applied to the electric vehicle charging system 2500. However, the electric vehicle charging system 2500 may use a resonant frequency in a band of a few KHz to tens of MHz, and may transmit power that is equal to or higher than tens of watts to charge the electric vehicle battery 2550.

Figure 26A:
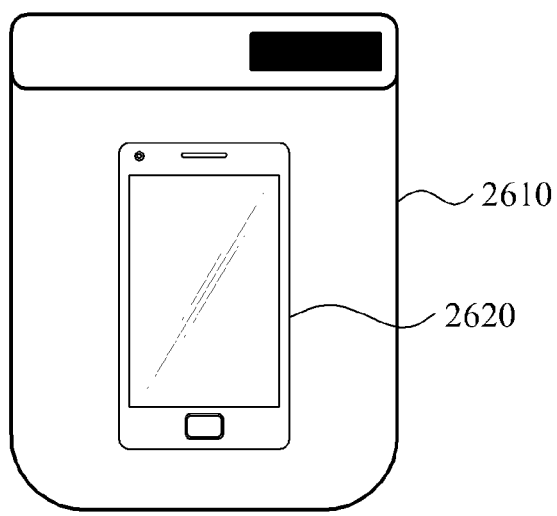
FIGS. 26A through 27B are diagrams illustrating examples of applications in which a wireless power receiver and a wireless power transmitter may be mounted.
Figure 26B:
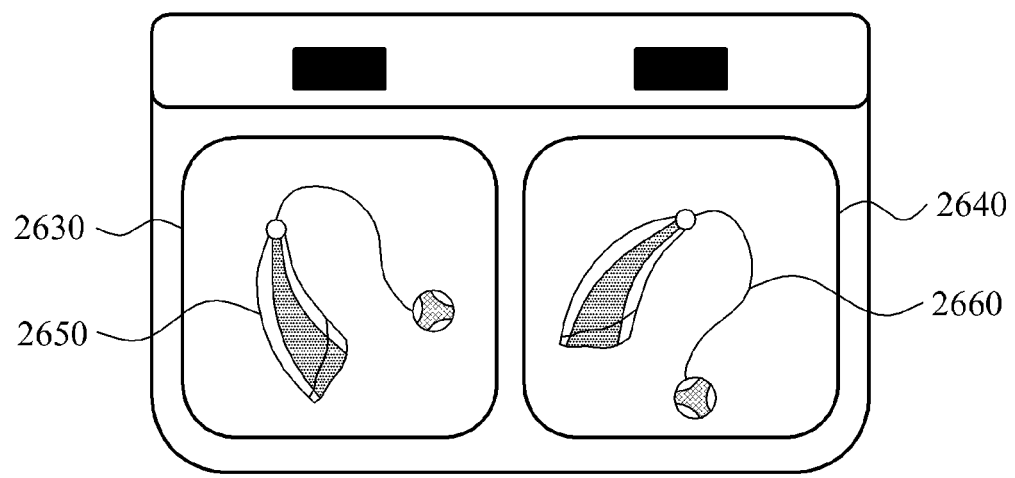

FIGS. 26A through 26B illustrate examples of applications in which a wireless power receiver and a wireless power transmitter may be mounted.

FIG. 26A illustrates an example of wireless power charging between a pad 2610 and a mobile terminal 2620, and FIG. 26B illustrates an example of wireless power charging between pads 2630 and 2640 and hearing aids 2650 and 2660.

In an example, a wireless power transmitter may be mounted in the pad 2610, and a wireless power receiver may be mounted in the mobile terminal 2620. The pad 2610 may be used to charge a single mobile terminal, namely the mobile terminal 2620.

In another example, two wireless power transmitters may be respectively mounted in the pads 2630 and 2640. The hearing aids 2650 and 2660 may be used for a left ear and a right ear, respectively. In this example, two wireless power receivers may be respectively mounted in the hearing aids 2650 and 2660.

Figure 27A:
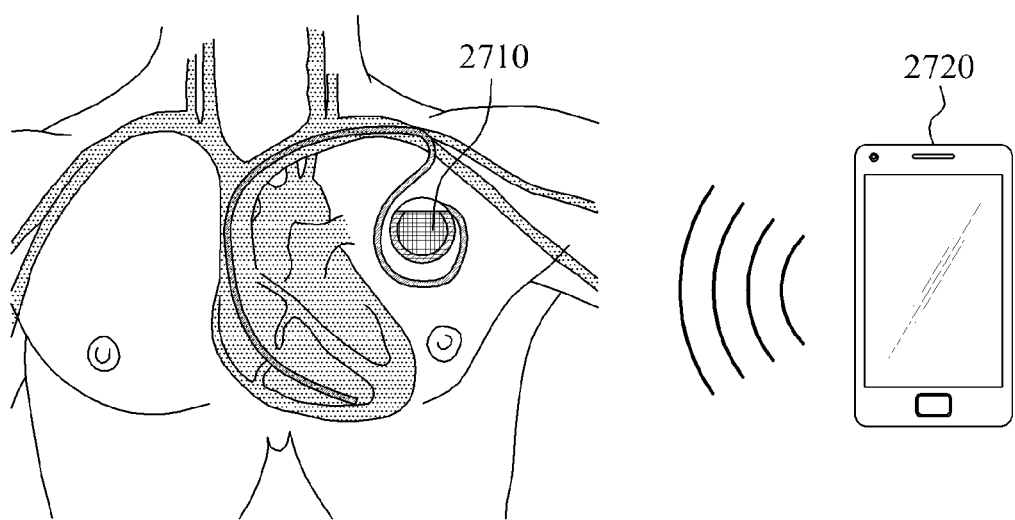
Figure 27B:
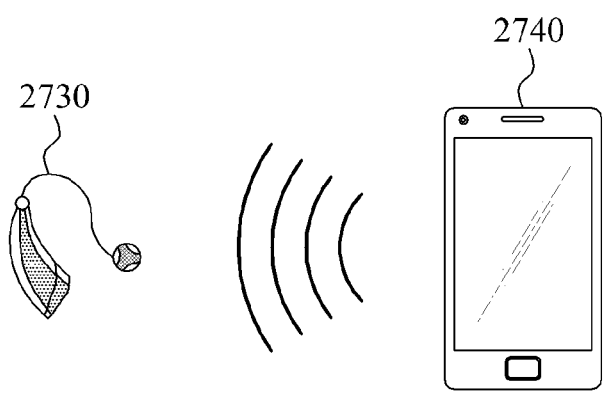

FIG. 27A illustrates an example of wireless power charging between an electronic device 2710 that is inserted into a human body, and a mobile terminal 2720. FIG. 27B illustrates an example of wireless power charging between a hearing aid 2730 and a mobile terminal 2740.

In an example, a wireless power transmitter and a wireless power receiver may be mounted in the mobile terminal 2720. In this example, another wireless power receiver may be mounted in the electronic device 2710. The electronic device 2710 may be charged by receiving power from the mobile terminal 2720.

In another example, a wireless power transmitter and a wireless power receiver may be mounted in the mobile terminal 2740. In this example, another wireless power receiver may be mounted in the hearing aid 2730. The hearing aid 2730 may be charged by receiving power from the mobile terminal 2740. Low-power electronic devices, for example Bluetooth earphones, may also be charged by receiving power from the mobile terminal 2740.

Figure 28:
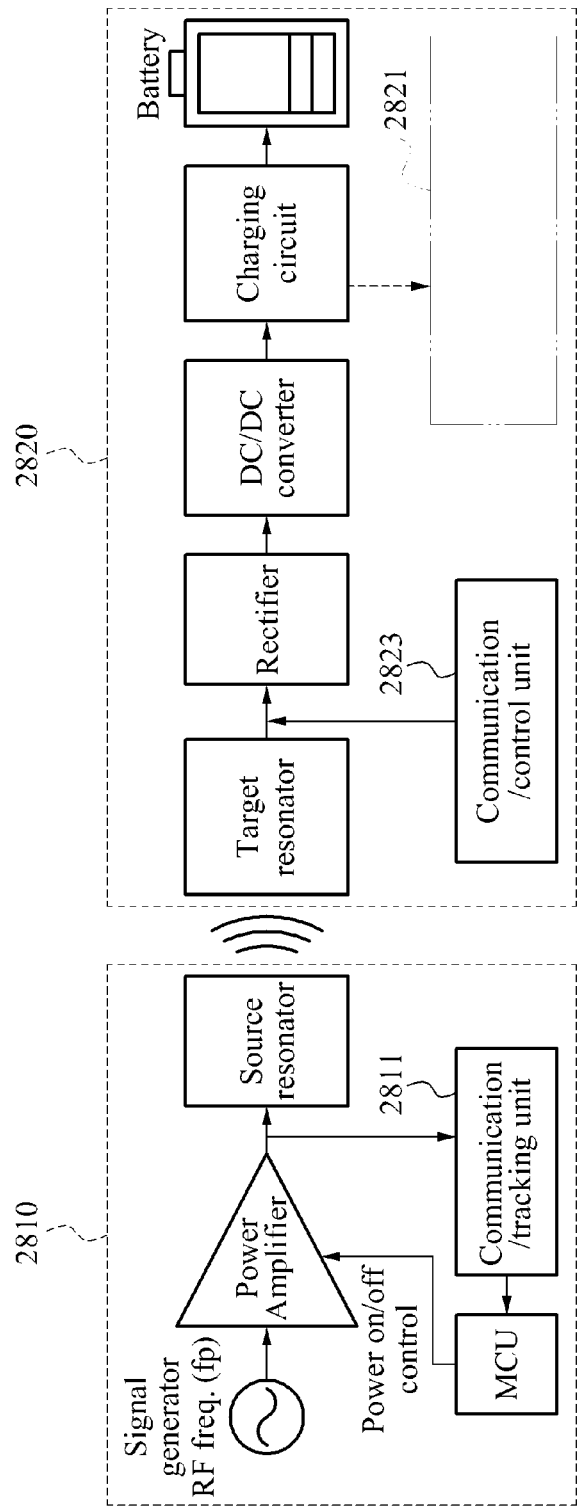
FIG. 28 is a diagram illustrating an example of a wireless power transmitter and a wireless power receiver.

FIG. 28 illustrates an example of a wireless power transmitter and a wireless power receiver.

In FIG. 28, a wireless power transmitter 2810 may be mounted in each of the pads 2630 and 2640 of FIG. 26B. Additionally, the wireless power transmitter 2810 may be mounted in the mobile terminal 2740 of FIG. 25B.

In addition, a wireless power receiver 2820 may be mounted in each of the hearing aids 2650 and 2660 of FIG. 26B.

The wireless power transmitter 2810 may have a similar configuration to the source device 110 of FIG. 1. For example, the wireless power transmitter 2810 may include a unit configured to transmit power using magnetic coupling.

As illustrated in FIG. 28, the wireless power transmitter 2810 includes a communication/tracking unit 2811. The communication/tracking unit 2811 may communicate with the wireless power receiver 2820, and may control an impedance and a resonant frequency to maintain a wireless power transmission efficiency. Additionally, the communication/tracking unit 2811 may perform similar functions to the power converter 114 and the control/communication unit 115 of FIG. 1.

The wireless power receiver 2820 may have a similar configuration to the target device 120 of FIG. 1. For example, the wireless power receiver 2820 may include a unit configured to wirelessly receive power and to charge a battery. As illustrated in FIG. 28, the wireless power receiver 2820 includes a target resonator, a rectifier, a DC/DC converter, and a charging circuit. Additionally, the wireless power receiver 2820 may include a control/communication unit 2823.

The communication/control unit 2823 may communicate with the wireless power transmitter 2810, and may perform an operation to protect overvoltage and overcurrent.

The wireless power receiver 2820 may include a hearing device circuit 2821. The hearing device circuit 2821 may be charged by the battery. The hearing device circuit 2821 may include a microphone, an analog-to-digital converter (ADC), a processor, a digital-to-analog converter (DAC); and a receiver. For example, the hearing device circuit 2821 may have the same configuration as a hearing aid.

In this example, a reference efficiency may be 60%, and the efficiency of wireless power transmission between the source resonator 760 and the target resonator 810 may be 50%. Based on the method of FIG. 22, the PA power may be increased from 10 W to 20 W. However, if the PA power is increased, the efficiency of wireless power transmission may be reduced below the reference efficiency. For example, the control/communication unit 710 may detect that the efficiency of wireless power transmission is reduced below the reference efficiency, may halt (or, interrupt) the operation of the source device 510, and may generate an alarm in the source device 510 to notify that it is impossible to charge the target device 520.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of detecting an efficiency of a wireless power transmission from a source device to a target device, the method comprising:
    receiving, from the target device, information about power used by the target device;
    determining a first power of a power amplifier (PA) of the source device based on the information about the power used by the target device;
    transmitting, to the target device, wireless power corresponding to the first power;
    determining a second power of the PA in response to a current of the PA converging to a constant level, wherein the current of the PA is changed until the target device receives wireless power corresponding to the information about the power used by the target device; and
    calculating the efficiency of the wireless power transmission based on the second power and the information about power used by the target device.

2. The method of claim 1, further comprising:
    receiving, from the target device, information about power that is received by the target device,
    wherein the efficiency is calculated based on the information about the power that is received by the target device and the second power.

3. The method of claim 1, further comprising in response to the current of the PA increasing, increasing a power level of the PA until the current of the PA becomes constant.

4. The method of claim 1, further comprising:
    interrupting an operation of the source device, in response to the calculated efficiency being lower than a reference efficiency.

5. A method of detecting an efficiency of a wireless power transmission from a source device to a target device, the method comprising:
    receiving, from the target device, information about power used by the target device;
    determining an output power of a power amplifier (PA) of the source device based on the information about power used by a target device;
    transmitting, to the target device, wireless power corresponding to the output power;
    receiving, from the target device, information about power that is received by the target device, wherein the information about the power that is received by the target device comprises information about a current flowing in a load modulator of the target device, in a state in which a connection to a load of the target device is blocked and the received power inputted to the load modulator of the target device; and
    calculating the efficiency of the wireless power transmission, based on the information about the power that is received by the target device and the output power.

6. The method of claim 5, further comprising:
    interrupting an operation of a source device, in response to the calculated efficiency being lower than a reference efficiency.

7. A computer-readable storage medium having stored therein program instructions to cause a processor to execute a method of detecting an efficiency of a wireless power transmission from a source device to a target device, the method comprising:
- receiving, from the target device, information about power used by the target device;
- determining a first output power of a power amplifier (PA) of the source device based on the information about power used by the target device;
- transmitting, to the target device, wireless power corresponding to the first power;
- determining a second power of the PA in response to a current of the PA converging to a constant level, wherein the current of the PA is changed until the target device receives wireless power corresponding the information about the power used by the target device; and
- calculating the efficiency of the wireless power transmission, based on the second power and the information about the power used by the target device.

8. A wireless power transmitter, comprising:
- a controller to determine a first power of a power amplifier (PA) of the wireless power transmitter based on information about power used by a target device received from the target device; and
- a resonator to transmit, to the target device, wireless power corresponding to the first power,
- wherein the controller
  - determines a second power of the PA in response to a current of the PA converging to a constant level, wherein the current of the PA is changed until the target device receives wireless power corresponding the information about the power used by the target device, and
  - calculates an efficiency of a wireless power transmission, based on the second power and the information about power used by the target device.

9. The wireless power transmitter of claim 8, wherein the controller receives the information about the power used by the target device from the target device.

10. The wireless power transmitter of claim 8, wherein the controller receives, from the target device, information about power that is received by the target device, and calculates the efficiency based on the information about the power that is received by the target device and the second power.

11. The wireless power transmitter of claim 8, wherein, in response to the current of the PA increasing, the controller increases a power level of the PA until the current of the PA becomes constant.

12. The wireless power transmitter of claim 8, wherein, in response to the calculated efficiency being lower than a reference efficiency, the controller interrupts an operation of a source device.

13. A wireless power transmitter, comprising:
- a controller to determine an output power of a power amplifier (PA) of the wireless power transmitter based on information about power used by a target device; and
- a resonator to transmit, to the target device, wireless power corresponding to the output power,
- wherein the controller
  - receives, from the target device, information about power that is received by the target device, wherein the information about the power that is received by the target device comprises information about a current flowing in a load modulator of the target device, in a state in which a connection to a load of the target device is blocked and the received power inputted to the load modulator of the target device, and
  - calculates an efficiency of a wireless power transmission, based on the information about the power that is received by the target device and the output power.

14. The wireless power transmitter of claim 13, wherein, in response to the calculated efficiency being lower than a reference efficiency, the controller interrupts an operation of a source device.

15. The wireless power transmitter of claim 13, wherein, in response to a value of a current of the output power being equal to or greater than a set value determined based on the efficiency and the output power, the controller interrupts the operation of the source device.

* * * * *